United States Patent [19]
Yamane et al.

[11] Patent Number: 5,764,648
[45] Date of Patent: Jun. 9, 1998

[54] METHOD AND APPARATUS FOR GENERATING A TRANSMISSION TIMING SIGNAL IN A WIRELESS TELEPHONE

[75] Inventors: Manabu Yamane; Junji Tanaka; Hideko Taniguchi; Mitsuru Morimoto, all of Tottori, Japan

[73] Assignees: Sanyo Electric Co., ltd., Osaka-Fu; Tottori Sanyo Electric Co. Ltd., Tottori, both of Japan

[21] Appl. No.: 502,684

[22] Filed: Jul. 14, 1995

[30] Foreign Application Priority Data

Jul. 20, 1994 [JP] Japan .................................. 6-168013
Nov. 21, 1994 [JP] Japan .................................. 6-286546
Nov. 25, 1994 [JP] Japan .................................. 6-291210

[51] Int. Cl.$^6$ .................................................. H04J 3/06
[52] U.S. Cl. .................. 370/516; 370/504; 370/350; 375/327; 375/331; 327/291
[58] Field of Search .......................... 370/516, 517, 370/518, 519, 347, 280, 350, 436, 503, 504; 375/354, 355, 200, 327, 331, 206, 357, 373, 376; 379/61, 60, 59, 63; 455/33.1

[56] References Cited

U.S. PATENT DOCUMENTS 5,260,944  11/1993  Tomabechi ........................ 370/347
5,384,828  1/1995   Brown et al. ....................... 379/61

FOREIGN PATENT DOCUMENTS 2-172391  7/1990   Japan .
5-30006   2/1993   Japan .
5-336021  6/1993   Japan .
6-90202   3/1994   Japan .
87/06083  10/1987  WIPO .

*Primary Examiner*—Wellington Chin
*Assistant Examiner*—Melissa Kay Carman
*Attorney, Agent, or Firm*—Panitch Schwarze Jacobs & Nadel, P.C.

[57] ABSTRACT

In a wireless telephone of a mobile communication system, which performs transmission in a series of bursts, in synchronism with a receive signal transmitted from a base station, each transmission burst being performed responsive to a transmission timing signal, a sync signal is detected from the receive signal, the transmission timing signal is generated on the basis of the sync signal, and each transmission burst is effected in accordance with the transmission timing signal. When the sync signal ceases to be detected, the transmission timing signal is autonomously generated for a certain time period after the sync signal is last detected. In another aspect of the invention, during reception in a first channel, the channel quality of another vacant channel is measured by transferring PLL data to a PLL prior to the slot in which the measurement is effected. In a further aspect of the invention, bit stream data transmitted from the base station is converted into byte stream data and used for control within the wireless telephone.

16 Claims, 30 Drawing Sheets

FIG.10A
PRIOR ART

TRANSMISSION
AT WIRELESS
TELEPHONE

FIG.10B
PRIOR ART

→ IDLE SLOT

RECEPTION
AT WIRELESS
TELEPHONE  | 6 | 1 | 2 | 3 |

FIG.10C
PRIOR ART

PLL DATA

STROBE

STv   STc

MEASUREMENT

Mv   Mc

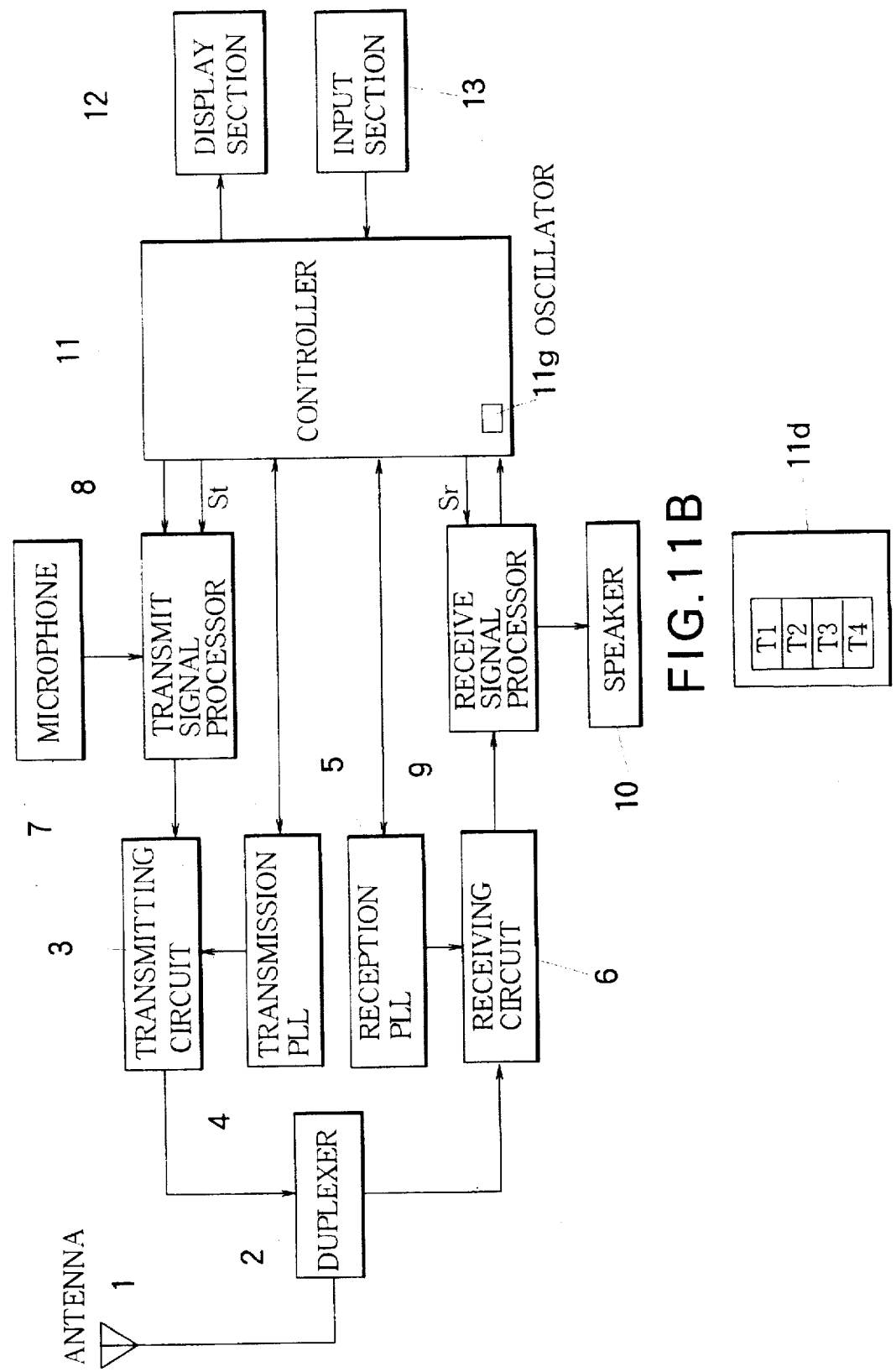

TRANSMISSION AT WIRELESS TELEPHONE

RECEPTION AT WIRELESS TELEPHONE

PLL DATA

STROBE

MEASUREMENT

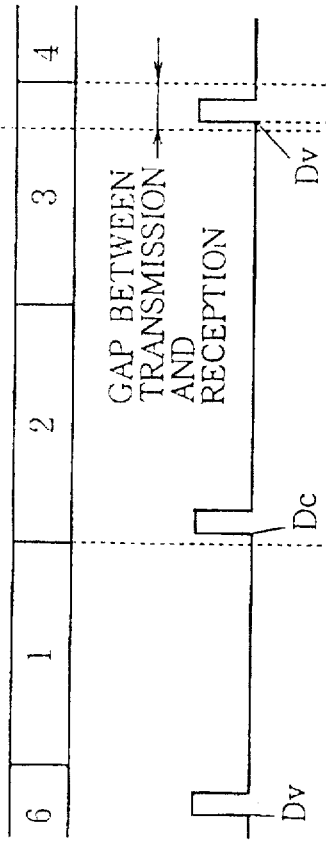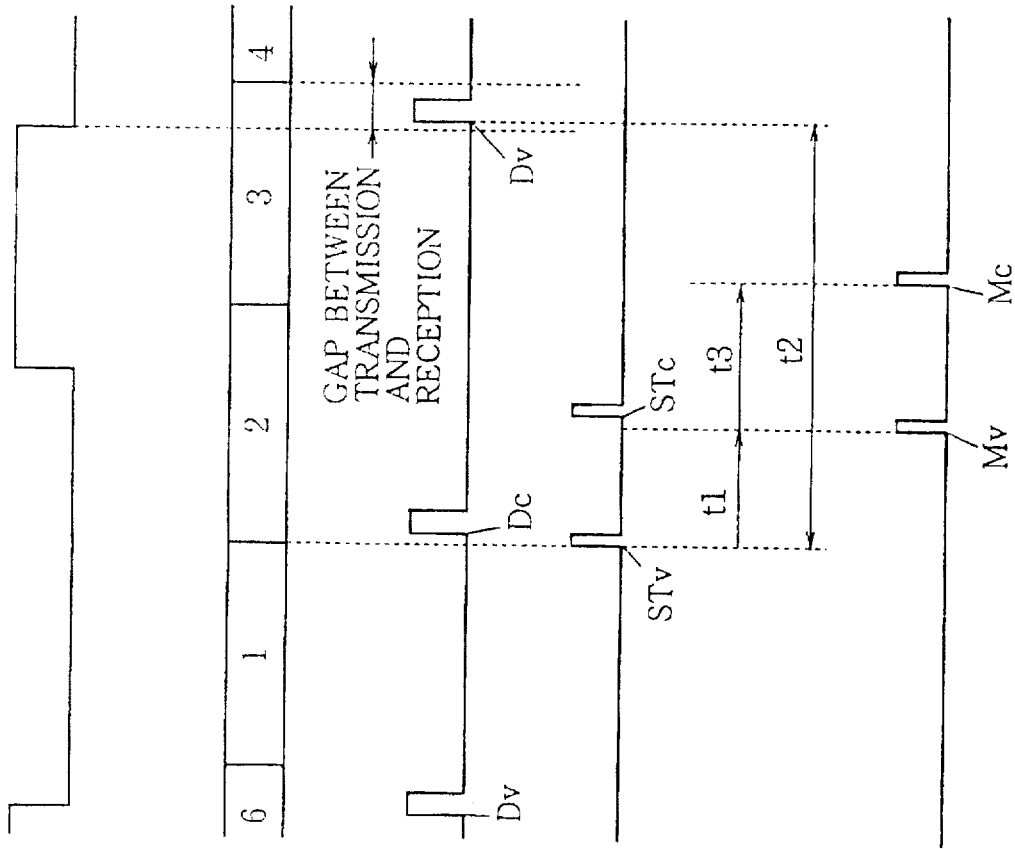

| Pr | Msg | |
|----|-----|---|
| 2 | 8 | |

00 / 11011100 / 00110001101 / 0 / 001 /
Pr    Msg       Chan     Rate   Slot

00000000 / 0000 / 00000 / 10 / 0 / 0 / 00 /
Dvcc     Dmac    Ta    Sb   Pm Mem Two "0" BITS

FIG.20C

16 / 8D01 / 00 / 01 / 00 / 00 / 00 / 02 / 00 / 00 /
type   chan   rate   slot   dvcc   dmac   ta    sb    pm    mem

FIG.22

| BIT TYPE | NUMBER OF BITS (no) | BYTE MEMORY POSITION (pos) |
|---|---|---|
| BIT | 11 | chan (01) |
| BIT | 1 | rate (03) |
| BIT-MSG | 3 | slot (04) |
| BIT | 8 | dvcc (05) |
| BIT | 4 | dmac (06) |
| BIT | 5 | ta (07) |
| BIT | 2 | sb (08) |
| BIT | 1 | pm (09) |
| BIT | 1 | mem (10) |
| DATA-END | ........ | ........ |

FIG.23A

/ 72 / 01 / 00 /
type  flag  reason

/ 00 / 11011010 / 000010 /
Pr     Msg          Rem-Len

/ 0001 / 000001 / 0000 / 00 /
Para    Num-Var   Reason  TWO "0" BITS

/ 00001110 / 00001110 /
Filler      Filler

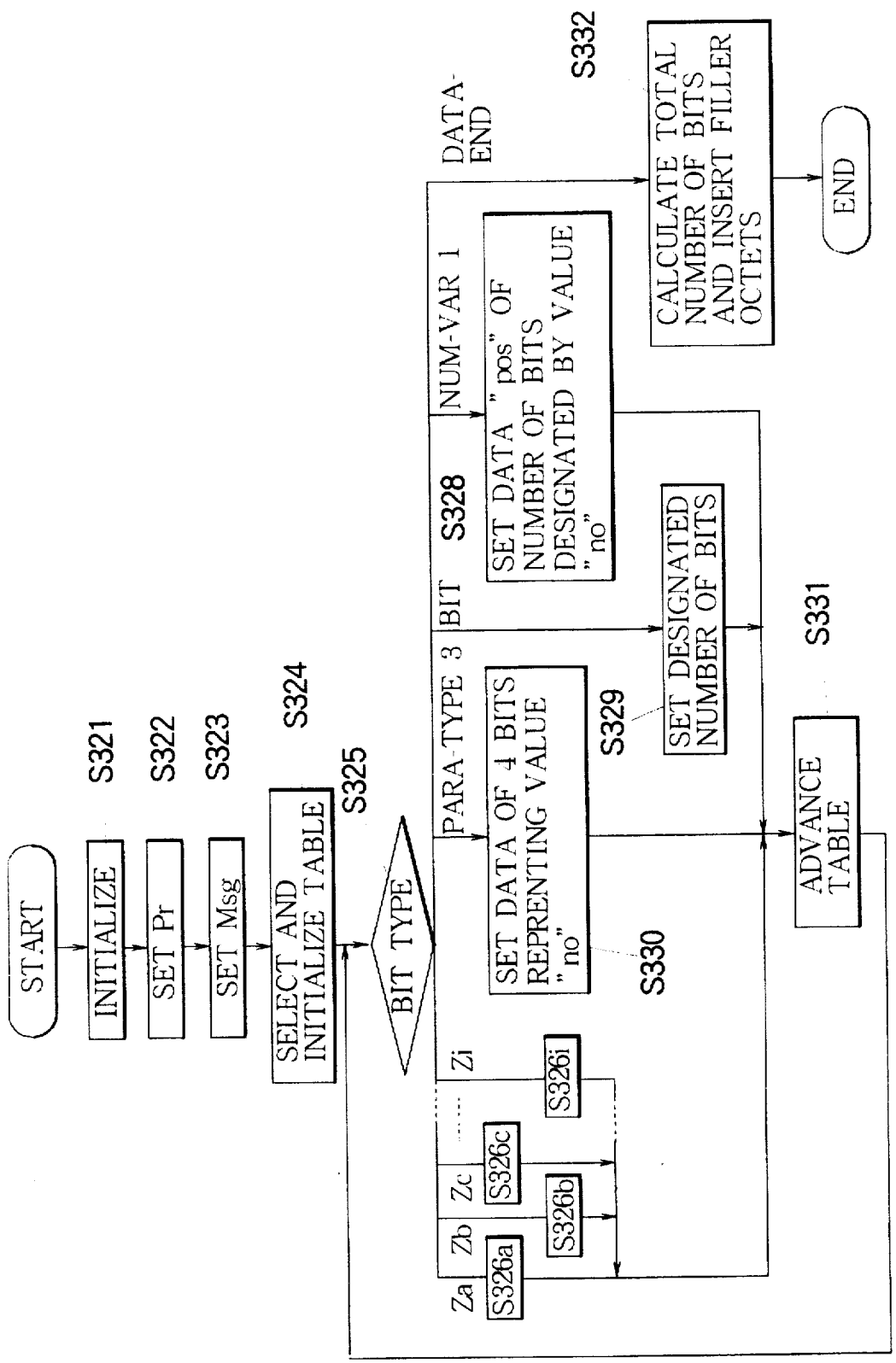

FIG. 25

| BIT TYPE | NUMBER OF BITS /DATA VALUE (no) | BYTE MEMORY POSITION (pos) |
|---|---|---|
| PARA-TYPE 3 | 1 | — |
| NUM-VAR 1 | 6 | 1 |
| BIT | 4 | reason (02) |
| DATA-END | ......... | ......... |

| tmp%8 | BitTbl[tmp %8] |
|---|---|
| 0 | 1 0 0 0 0 0 0 0 |
| 1 | 0 1 0 0 0 0 0 0 |
| 2 | 0 0 1 0 0 0 0 0 |
| 3 | 0 0 0 1 0 0 0 0 |
| 4 | 0 0 0 0 1 0 0 0 |
| 5 | 0 0 0 0 0 1 0 0 |
| 6 | 0 0 0 0 0 0 1 0 |
| 7 | 0 0 0 0 0 0 0 1 |

348

METHOD AND APPARATUS FOR GENERATING A TRANSMISSION TIMING SIGNAL IN A WIRELESS TELEPHONE

BACKGROUND OF THE INVENTION

The present invention relates to a wireless telephone, also called a mobile station, used as a portable telephone or a mobile telephone in a digital wireless communication system.

In recent years, wireless telephones of a time division multiplex access (TDMA) system have been put to practical use. An example of such wireless telephone is disclosed in Japanese Patent Kokai Publication No. 104861/1994.

FIG. 1 shows the basic configuration of a digital wireless telephone of the TDMA system. In FIG. 1, a radio-frequency signal transmitted from a base station, not shown, is received by an antenna 1, and supplied via a duplexer 2 to a receiving circuit 6.

The receiving circuit 6 converts the received RF signal into a digital baseband signal, and supplies it to a receive signal processor 9. The receive signal processor 9 detects, from the baseband signal, a sync signal of a slot allocated to the wireless telephone, as will be described later, extracts data signals and demodulates the data signals into audio signals, and supplies them to a speaker 10, and notifies a controller 11 of an end of the allocated slot. The speaker 10 converts the audio signal into speech.

The audio signals having been obtained by converting speech by means of a microphone 7 are converted by a transmit signal processor 8 under control of the controller 11, into a digital baseband signal, and further converted into an RF signal by a transmitting circuit 3. The RF signal supplied from the transmitting circuit 3 is supplied via the duplexer 2 to the antenna 1, and then transmitted to the base station, not shown.

The reception frequency at the receiving circuit 6 and the transmission frequency at the transmitting circuit 3 are determined by the reception phase sync loop (PLL) 5 and a transmission PLL 4 controlled by the controller 11. Details of these PLLs will be described later.

FIG. 2 is a block diagram showing the configuration of the controller 11 in FIG. 1. Referring to FIG. 2, the controller 11 comprises a CPU 11a coupled with a ROM 11b, an EEPROM 11c, a RAM 11d, and an I/O 11e via an address/data bus 11f.

A user of the telephone makes a call by inputting commands, telephone number and the like into the controller 11 by means of a key input section 13 comprising key pads. A display section 12 comprises a liquid crystal display, for example, displays the input commands, telephone number, or messages prompting user to take some action, the state of connection of the circuit of the wireless telephone, and the like.

FIG. 3 is a diagram showing the timing of the TDMA operation in the mobile communication system of the TDMA system stipulated in IS-54-B standard (hereinafter referred to as IS-54) of Electronic Industries Association (EIA) and Telecommunication Industry Association (TIA) in the United States.

Referring to FIG. 3, the base station continuously transmits signals having been divided into slots, and the portable telephone can continuously receive the signal transmitted from the base station, while the wireless telephone transmits the signals in series of bursts at predetermined timings. The timings of transmission of the signals from the wireless telephone are stipulated to be in synchronism with the timing detected from the signal transmitted from the base station and received at the wireless telephone.

As will be apparent from FIG. 3, one frame of transmission and reception of signals between the base station and wireless telephone is formed of 972 symbols, and 40 msec. long.

One frame of the transmission and reception is divided into six slots 1 to 6. The symbol rate is 24.3 kSymbols/sec per channel. When the voice codec is of a full rate, two slots in one frame are allocated to communication between the base station and one wireless telephone. That is, one base station can communicates, in each channel, with three wireless telephones per channel in parallel.

The allocation of the slots within each frame may be such that a combination of the slots 1 and 4, a combination of the slots 2 and 5, and a combination of the slots 3 and 6 may be allocated for the respective wireless telephones. In the following explanation, it is assumed that the slots 1 and 4, indicated by hatching in FIG. 3, are allocated to the communication between the base station and the wireless telephone in question. It is stipulated that the wireless telephone ends the transmission of the signals 45 symbols (about 1.85 msec.) before the commencement of the allocated slot.

FIG. 4 shows the configuration of one slot of a transmit signal from the base station, i.e., a receive signal at the wireless telephone. It comprises a sync signal of 14 symbols, data signals and the like of 142 symbols, and spare part of six symbols. FIG. 5 shows the configuration of one slot of a transmit signal at the wireless telephone. It comprises a guard of three symbols, a ramp-up of three symbols, a sync signal of 14 symbols, and data signals and the like of 134 symbols.

When the processing is made by means of a software using a microprocessor in the conventional wireless telephone, the sync signal for the allocated slot, contained in the receive signal received immediately before is detected, and the transmission timing is generated from the timing at which the sync signal is detected, and the transmit signal is transmitted at the transmission timing. When the sync signal of the receive signal is not detected, the transmission of the transmit signal is stopped.

However, even if there is an instance when the receive signal is not detected for some reason, the transmit signal may be properly received at the base station. This is because the environment, such as fading may be different between the time of transmission and time of reception. The propagation path may also be different between the transmission and the reception. Accordingly, if the transmission is stopped when the sync signal is not detected, as described above, then there will be no possibility at all of the transmit signal from the wireless telephone being received at the base station, and the smooth demodulation at the base station may be prevented, and the speech may be interrupted or intermittent.

In a conventional digital mobile communication system of the TDMA system, a mobile assisted hand-off (MAHO) function by the wireless telephone, as a mobile station, has been realized. The MAHO function is generally as follows:

In digital wireless telephone of the TDMA system, during MAHO operation, the wireless telephone is made to perform measurement of the channel quality, such as electrostatic field i.e., received signal strength (RSS) or the like, of each of the currently-used channel and one or more other channels (up to 12 channels) having vacant a slot (hereinafter called a "vacant channel"), and if the channel quality of any of the vacant channels is better than that of the current channel, then hand-off from the current channel to the vacant channel for which the better channel quality has been measured is performed.

FIG. 6 shows the protocol sequence in the MAHO operation between the base station and a wireless telephone, in a digital communication system of the TDMA system.

The base station issues a Measurement Order (S1) for inspecting the channel quality (reception condition) of the current channel in terms of numerical data concerning the RSS, the bit error rate, and the like, and also to inspect the channel quality of one or more vacant channels.

When the wireless telephone receives the Measurement Order (S1), it issues Mobile Ack (S2) and transmits it to the base station, and starts the MAHO operation.

In this MAHO operation, the wireless telephone alternately measures the channel quality, such as the RSS, of a selected one of the vacant channels specified by the information in the Measurement Order (S1) and the channel quality of the current channel. The results of the measurement are transmitted as Channel Quality Message (S3) and Channel Quality Message (S4) to the base station. Hand-off to a better channel is achieved on the basis of the results of the measurements.

In the MAHO operation, the channel quality of the current channel and the vacant channel must be measured alternately. For this reason, the wireless telephone alters the reception frequency of the reception PLL 5 shown in FIG. 1 to receive a signal in a vacant channel during the MAHO operation, performs the measurement of the channel quality of the vacant channel, and then returns the reception frequency of the reception PLL 5 to performs the reception in the current channel.

FIG. 7A is a block diagram showing the reception PLL 5, and FIG. 8A to FIG. 8C are timing charts for explaining the process of altering the reception frequency at the reception PLL. The process of altering the reception frequency at the reception PLL will next be described with reference to FIG. 7A and FIG. 8A to FIG. 8C.

First, from the serial input/output (SIO) 11g of the CPU 11a, reception PLL data (FIG. 8B) corresponding to the frequency to which the output frequency of the PLL 5 is to be altered is supplied to and written in a set frequency data register 5a in the reception PLL 5 in synchronism with a clock (FIG. 8A).

The reception PLL data is supplied serially, rather than in parallel, from the CPU 11a to the PLL 5 is to reduce the number of pins of the CPU 11a and the PLL 5.

At the timing at which the frequency is to be altered, a PLL strobe signal (FIG. 8C) which is one of bits of parallel data from a parallel input/output (PIO) 11h of the CPU 11a is supplied to the set frequency data register 5a, so as to transfer the reception PLL data (frequency division factor data) written in the data register 5a to the programmable frequency divider 5b.

The set frequency data register 5a is formed, for example as shown in FIG. 7B. That is, it comprises a serial/parallel register 5h, and a latch circuit 51. The serial data from the CPU 11a is written, bit by bit, in the serial parallel converter 5h, which output its contents in parallel form. After all the bits are written in the serial/parallel converter 5h, and when the PLL strobe signal is applied to the latch circuit 5b (at the timing when the reception frequency is to be altered), the output from the serial/parallel converter 5h is written in the latch circuit 5i. When the output of the serial/parallel converter 5h is written in the latch circuit 5i, its output is promptly altered.

The programmable frequency divider 5b frequency-divides the output of the voltage controlled oscillator 5g, to be described later, with a frequency division factor programmed by the frequency division factor data, and supplies the frequency-divided signal to one of the inputs of a phase comparator 5e.

The frequency divider 5c frequency-divides the signal of a fixed frequency from a reference oscillator 5d, and supplies the frequency-divided signal to the other input of the phase comparator 5e.

The phase comparator 5e outputs pulses corresponding to the phase difference between the two input signals, and supplies the pulses to a low-pass filter (LPF) 5f. The LPF 5f converts the input pulses into a DC control voltage, and supplies it to the voltage-controlled oscillator 5g to control its oscillating frequency.

The oscillating frequency of the voltage controlled oscillator 5g is supplied as the output of the reception PLL 5 to the receiving circuit 6 in FIG. 1, and also is fed back to the programmable frequency divider 5b.

If the frequency division factor of the programmable frequency divider 5b is N (positive integer), the output frequency of the frequency divider 5c is fr, and the oscillating frequency of the voltage controlled oscillator 5g is fo, then the following equation holds:

$$fo=N\cdot fr$$

Next, FIG. 9 is a flowchart showing the MAHO operation of the CPU 11a in. the wireless telephone of the TDMA system, and FIG. 10A to FIG. 10E are its timing charts. The MAHO operation will be described in further detail referring to FIG. 9 and FIG. 10A to FIG. 10E.

When the MAHO operation is started, the CPU 11a, at step S1, first makes judgment as to whether or not it is now in an idle slot (one of the slots not used by or allocated to any of the wireless telephones).

When it is judged at step S1 that it is now in an idle slot, the serial reception PLL data Dv (FIG. 10C) for a vacant channel (or a selected one of vacant channels) for which the measurement should be made is supplied from the serial input/output 11g of the CPU 11a and set in the set frequency data register 5a in the reception PLL 5 (step S2).

When the reception PLL data has been set, and when it becomes the timing at which the frequency should be altered to that for the vacant channel, the PLL strobe signal STv (FIG. 10D) which is one of the bits of the parallel input/output 11h of the CPU 11a is supplied to the set frequency data register 5a (step S3). Then, judgment is made as to whether the reception PLL 5 has been phase locked (step S4). This in fact is done by judging whether a predetermined lock-up has elapsed after the PLL strobe signal. It is however possible to measure the phase difference, and judges that the reception PLL 5 has been phase-locked when the measured phase difference is smaller than a predetermined value.

When it is judged that the phase-lock has been attained, measurement of the channel quality of the vacant channel is conducted at timing Mv (FIG. 10E and step S5).

While the measurement for the vacant channel is effected, the serial reception PLL data Dc (FIG. 10C) for the current channel is then supplied from the serial input/output 11g of the CPU 11a and set in the set frequency data register 5a in the reception PLL 5.

When the setting of the reception PLL data is completed, and when it becomes the timing at which the frequency is returned to that for the current channel, the PLL strobe signal STc (FIG. 10D) which is one of the bits of the parallel input/output 11h of the CPU 11a is supplied to the set frequency data register 5a. Judgment is then made as to whether the reception PLL 5 has been phase-locked.

When it is judged that the phase-lock has been attained, the measurement of the channel quality of the current channel is conducted at timing Mc (FIG. 10E).

The measurement of the channel quality of the current channel is conducted in the same way, in a period other than the allocated slot.

In the wireless telephone of the TDMA system in the prior art, when the full rate codec is used, the measurement of the vacant channel and the current channel needs to be completed within 11 msec. from the setting of the reception PLL data in the data register 5a. That is, the time Tm up to the measurement of the current channel must be less than 11 msec.

That is, if the sum of the time for the setting of the PLL data for the vacant channel, the lock-up time Lv which the reception PLL 5 requires for phase lock to the vacant channel, the time for measurement for the vacant channel, the time for the setting of the PLL data for the current channel, the lock-up time which the reception PLL 5 requires for phase lock to the current channel, and the time for measurement for the current channel exceeds the above-mentioned stipulated time, then it is not possible to return to the current channel before the commencement of the current channel reception slot (e.g., the slot 4), and the reception of the current channel from the base station is no longer possible. The timing with which it is possible to return to the current channel is called MAHO timing.

Another problem of the conventional wireless telephone accompanies the increase in control data exchanged between the wireless telephone and the base station. In the past, not so much amount of such control data was exchanged, and the positions of the control data within bit stream data are fixed, so that the designated bits are directly analyzed, created, or processed, by programs.

However, in recent wireless telephone, data is digitized, and functions are more complicated, so that the number and types of exchanged control data are increased, and the format of control data is more complicated. To process the communication data by the use of programs as in the prior art, a ROM of a large capacity is required, and the cost is increased. The size of the wireless telephone is increased, and its portability is degraded.

SUMMARY OF THE INVENTION

An object of the invention is to enable transmission from the wireless telephone for a certain period when the sync signal in the receive signal is ceased to be detected at the wireless telephone.

Another object of the invention is to provide a digital wireless telephone of the TDMA system which can return to the current channel in time after the MAHO operation.

Another object of the invention is to provide a digital wireless telephone of the TDMA system which can perform the MAHO operation without degradation in the transmitted voice quality or interference in the data communication due to noises.

A further object of the invention is to provide a digital wireless telephone of the TDMA system which is small-sized, is inexpensive, and can perform the MAHO operation.

A further object of the invention is to provide a wireless telephone which can cope with increase in the number of types of the control data transmitted from or to the base station, by only a slight increase in the capacity of a ROM.

According to an aspect of the invention, there is provided a wireless telephone of a mobile communication system, which performs transmission in series of bursts, in synchronism with a receive signal, transmitted from the base station, each burst being performed responsive to a transmission timing signal, comprising:

means for detecting a sync signal from the receive signal;

means for generating said transmission timing signal on the basis of the sync signal;

means for autonomously generating said transmission timing signal when the sync signal is not detected;

means effecting said each burst in accordance with the transmission timing signal; and means for preventing generation of said transmission timing signal when the sync signal is not detected for a predetermined time.

Said means for autonomously generating said transmission timing signal may comprise timer means measuring a predetermined time corresponding to an interval between successive bursts, from the generation of the transmission timing signal for a preceding burst, with the measurement of the predetermined time being made by reference to an internal oscillator.

According to another aspect of the invention, there is provided a method of communication of a wireless telephone of a mobile communication system, which performs transmission in a series of bursts, in synchronism with a receive signal in the form of a frame, transmitted from the base station, each burst being performed responsive to a transmission timing signal, comprising the steps of:

detecting a sync signal from the receive signal;

generating, when said sync signal is detected, the transmission timing signal on the basis of the sync signal;

autonomously generating the transmitting timing signal when the sync signal is not detected;

effecting said each burst in accordance with the transmission timing signal; and stopping the generation of the transmission timing signal when the sync signal is not detected for a predetermined time.

Said step of autonomously generating said transmission timing signal may comprise measuring a predetermined time corresponding to an interval between successive bursts from the generation of the transmission timing signal for a preceding burst, with the measurement of the predetermined time being made by reference to an internal oscillator.

With the above arrangement, if for some reason, the signal from the base station is not received at the wireless telephone, transmission from the wireless telephone is continued until the expiration of a predetermined time. Accordingly, reception at the base station of the transmit signal from the wireless telephone can be continued.

According to another aspect of the invention, there is provided a wireless telephone of a TDMA system having a MAHO function, comprising:

reception means receiving a signal from a base station, said reception means capable of reception in a selected one of a plurality of channels of different frequencies;

a controller for causing the reception means in a state of reception in a first channel, to perform tentative reception and measurement in a second channel to find whether it is desirable to change a reception channel signal from the first channel to the second channel;

a PLL for determining the frequency of the signal to be received by said reception means;

said controller normally causing said PLL to generate a first frequency corresponding to the first channel by providing said PLL with first control data, causing, during said MAHO operation, said PLL to generate a second frequency corresponding to the second channel by providing said PLL with second control data, and applying a change timing signal for causing the PLL to change from the first frequency to the second frequency; and means for measuring the channel quality of the said second channel;

wherein said signal transmitted from said base station is time-divided in a plurality of slots including a first slot which is currently allocated to the wireless telephone and a second slot in which the measurement of the channel quality of said second channel is to be effected, and said controller performs the operation for transferring the first control data to said PLL, prior to the commencement of the second slot, and performs said operation for changing the generated frequency during said second slot.

With the above arrangement, the time required for the MAHO measurement to be completed after the commencement of the idle slot (in which the measurement is effected) is shorter by the length of time necessary for transferring the control data. The requirements on the MAHO timing can thus be met.

It may be so arranged that said controller transfers the second control data to said PLL in said first slot.

With the above arrangement, the influence of transfer of the PLL data on the reception of the signal from the base station can be eliminated.

It may be so arranged that said controller transfers the second control data to said PLL during a period other than a period for transmission from the wireless telephone to the base station.

With the above arrangement, influence of transfer of the PLL data on the transmission of the signal to the base station can be eliminated.

According to another aspect of the invention, there is provided a wireless telephone comprising:

a receive bit stream data memory for storing bit stream data received from a base station;

a plurality of message tables selected according to a message type of the bit stream data, each message table defining how each part of the bit stream data is to be processed for conversion into byte stream data; and control means for extracting said each part of the bit stream data and producing a corresponding part of byte stream data;

said each message table designating the number of bits forming said each part of the bit stream data.

It may be so arranged that said each message table further designating the memory location within said bit stream data memory from which said each part of the bit stream data should be extracted.

It may be so arranged that the wireless telephone further comprises a receive byte stream data memory for storing the byte stream data, wherein said each message table designates a memory location in said receive byte stream data memory into which said corresponding part of the byte stream data obtained by conversion from the bit stream data is to be stored.

It may be so arranged that said each message table defining the manner of processing said each part of the bit stream data according to a bit type of said each part.

With the above arrangement, the receive bit stream data memory which is, for instance, allocated in a RAM 11d stores bit stream data such as forward digital traffic channel (FDTC) output from a receive signal processor. The selected message table indicates how each part of the bit stream data should be processed for conversion. The process may be selected according to the bit type of each part of the bit stream data. The number of bits to be extracted from the bit stream data is designated. In some instances, the designated number of bits are skipped, rather than being read.

Because the bit stream data transmitted from the base station is converted into byte stream data, the operation within the wireless telephone needs only to handle byte data. The software for such operation is simpler, and the size of the ROM storing the software can be reduced.

According to another aspect of the invention, there is provided a wireless telephone comprising:

a transmit byte stream data memory for storing byte stream data to be transmitted to a base station;

a plurality of message tables selected according to a message type of the byte stream data, each message table defining how each part of the byte stream data is to be processed for conversion into bit stream data;

control means for extracting said each part of the byte stream data and producing a corresponding part of bit stream data; and a transmit bit stream data memory for storing the bit stream data obtained by conversion from said byte stream data;

said each message table designating the bit position into which said corresponding part of the bit stream data is to be stored.

It may be so arranged that said each message table designates the byte position in said byte stream data memory from which said each part of the byte stream data is to be extracted.

It may be so arranged that said each message table defining the manner of processing said each part of the byte stream data according to a bit type of said each part.

With the above arrangement, the transmit byte stream data memory which is, for instance, allocated in a RAM 11d stores byte stream data such as reverse digital traffic channel (RDTC) output via a transmit signal processor. The selected message table indicates how each part of the byte stream data should be processed for conversion. The process may be selected according to the bit type of each part of the byte stream data. The number of bit positions in a transmit bit stream data memory into which the corresponding part of the bit stream data is to be stored may also be designated.

Because the bit stream data transmitted to the base station is obtained by conversion from byte stream data, the operation within the wireless telephone needs only to handle byte data. The software for such operation is simpler, and the size of the ROM storing the software can be reduced.

BRIEF DESCRIPTION OF THE DRAWINGS

The above and other objects of the invention, its features and advantages will be more apparent from the description of the embodiment with reference to the drawings, in which:

FIG. 10A to FIG. 10E are timing charts showing the MAHO operation of the digital wireless telephone of the TDMA system in the prior art;

FIG. 11A is a block diagram showing the configuration of a digital wireless telephone of the TDMA system of an embodiment of the invention;

FIG. 11B is a diagram showing the contents of part of the RAM in the controller 11 shown in FIG. 11A;

FIG. 17A to FIG. 17E are timing charts showing the MAHO operation of the digital wireless telephone of the embodiment of FIG. 16A and FIG. 16B;

FIG. 20A to FIG. 20C are diagrams showing an example of forward digital traffic channel data (FDTC) in the form of bit stream data and corresponding byte stream data;

FIG. 22 is a diagram showing an example of the receive bit definition table used for processing the receive bit stream data of FIG. 21;

FIG. 23A to FIG. 23C are diagrams showing an example of a reverse digital traffic channel data (RDTC), in the form of byte stream data and corresponding bit stream data;

FIG. 24 is a flowchart showing the operation for converting the transmit byte stream data into bit stream data;

FIG. 25 is a diagram showing a transmit bit definition table used for processing the transmit byte stream data of FIG. 24;

DETAILED DESCRIPTION OF THE PREFERRED EMBODIMENTS

An embodiment of the invention will now be described with reference to FIG. 11A, FIG. 11B, FIG. 12 and FIG. 13 as well as FIG. 1 and FIG. 2.

Figure 1:
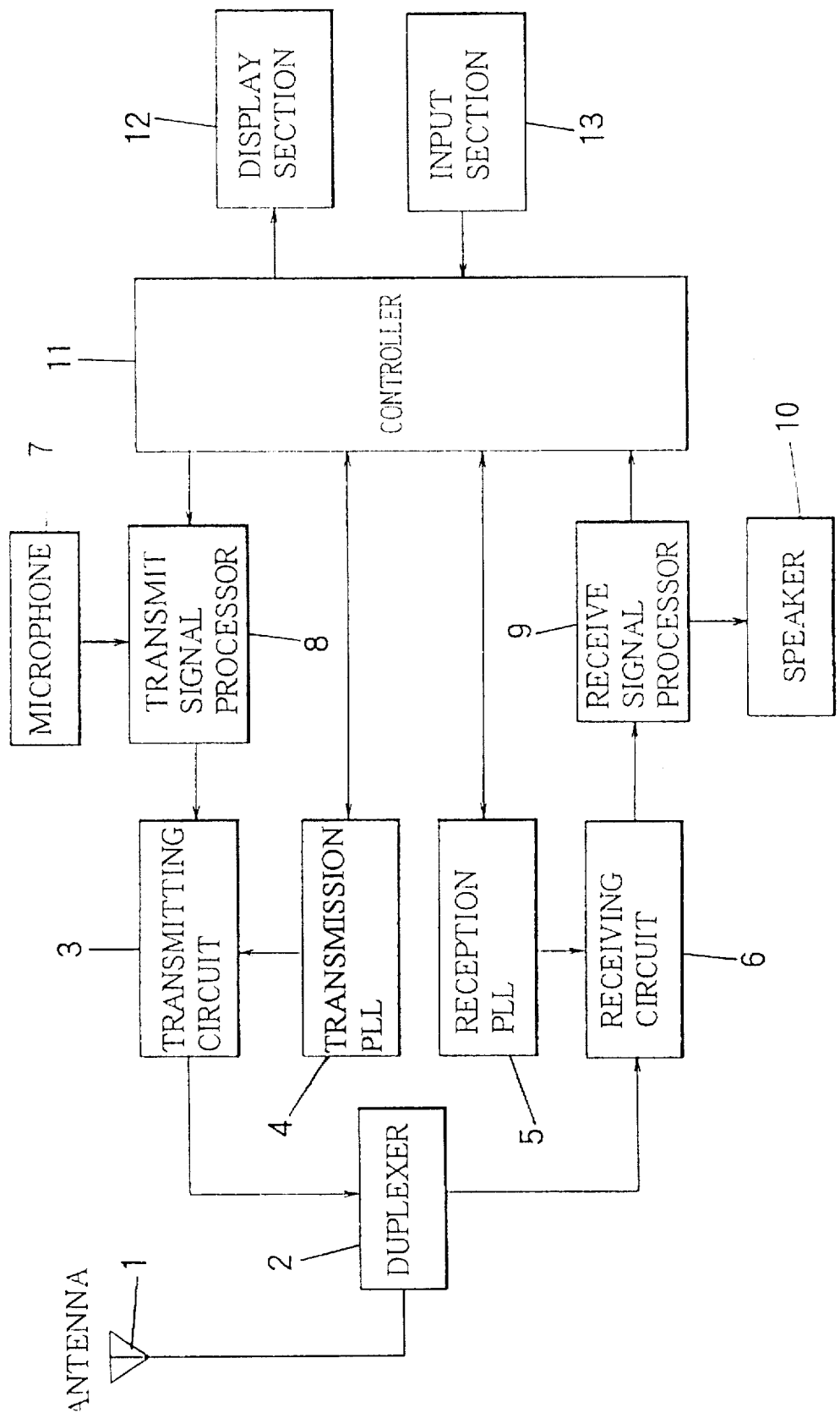
FIG. 1 is a block diagram showing the basic configuration of a conventional digital wireless telephone of the TDMA system.
Figure 2:
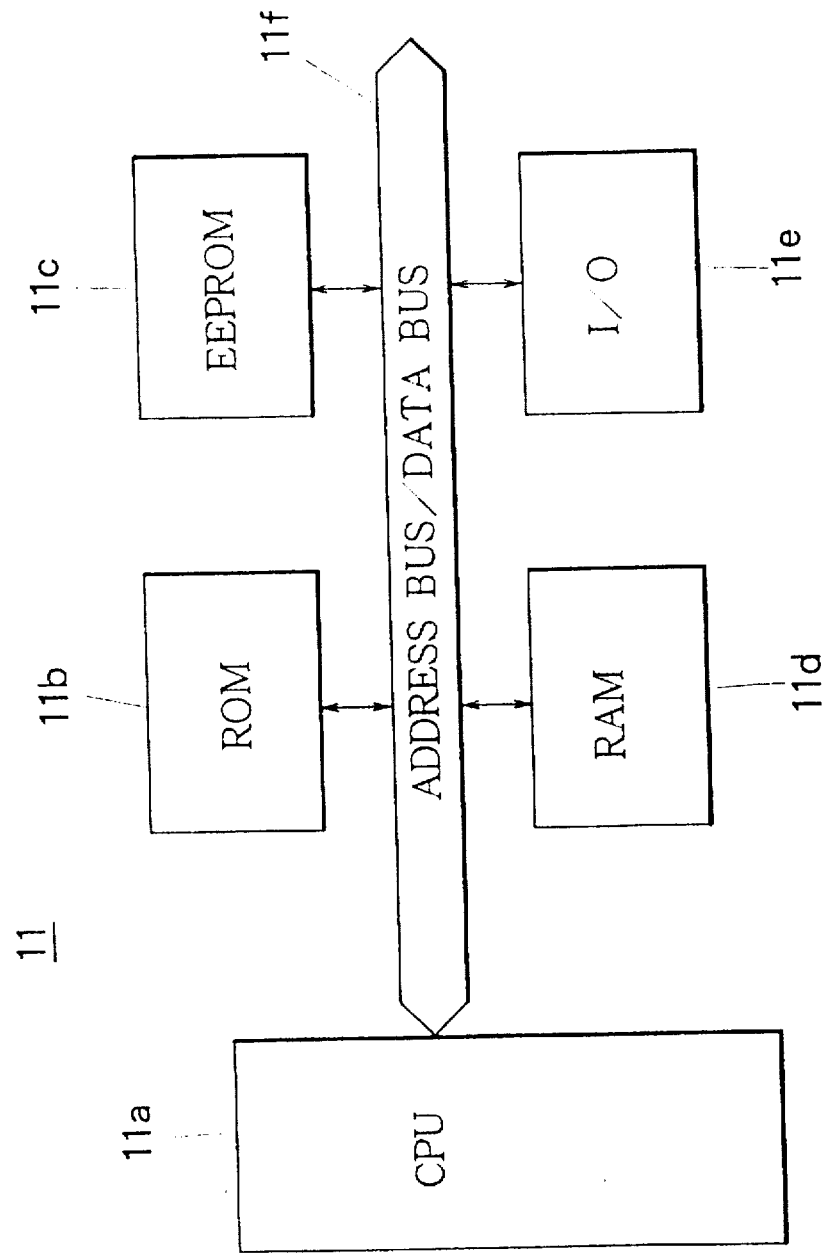
FIG. 2 is a diagram showing the details of the configuration of the controller shown in FIG. 1.
Figure 3:
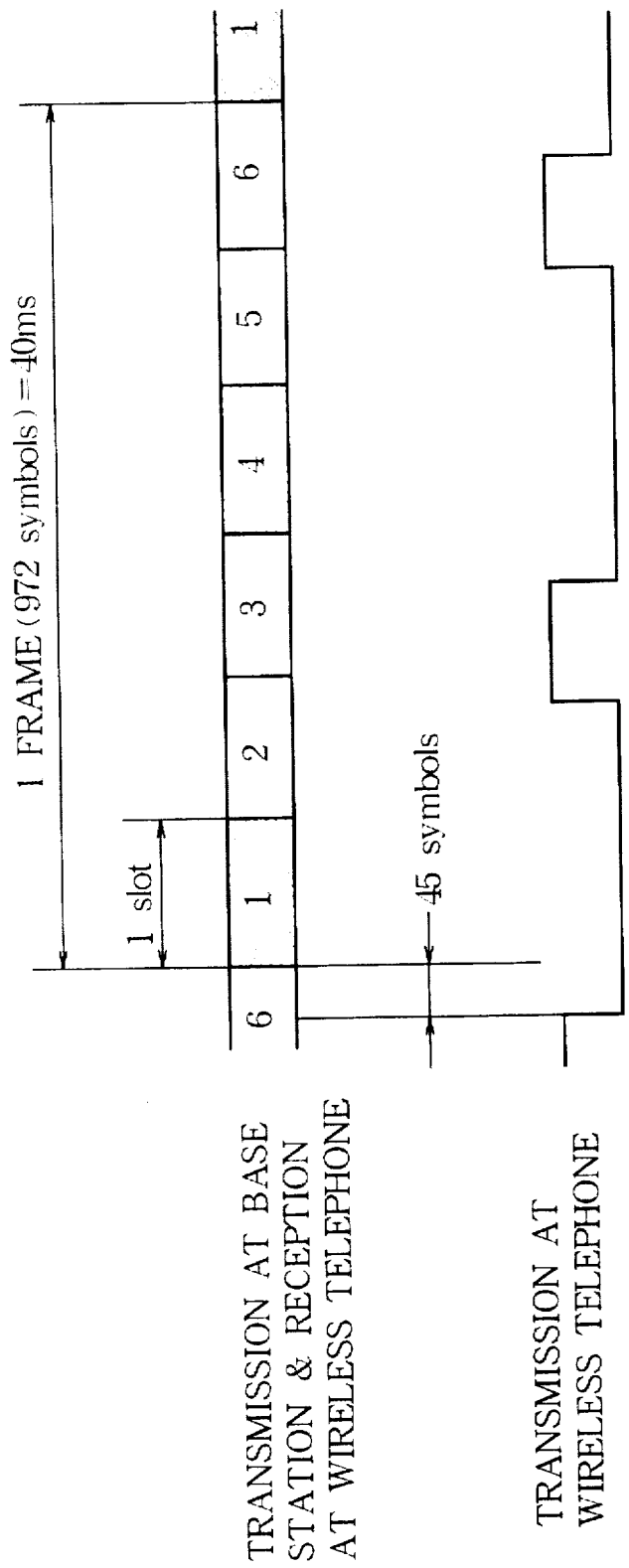
FIG. 3 is a diagram showing the timing of the TDMA operation in the mobile communication system of the TDMA system.
Figure 4:
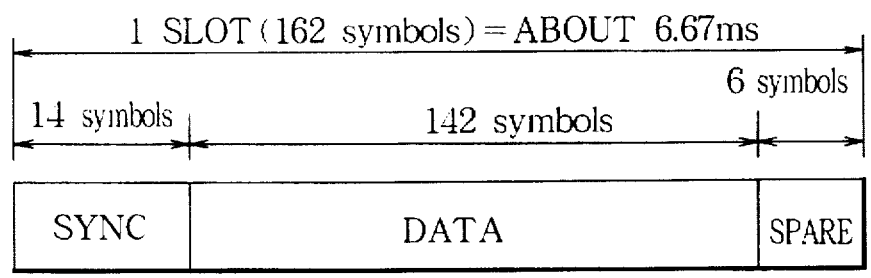
FIG. 4 is a diagram showing the configuration of one slot of a transmit signal from the base station.
Figure 5:
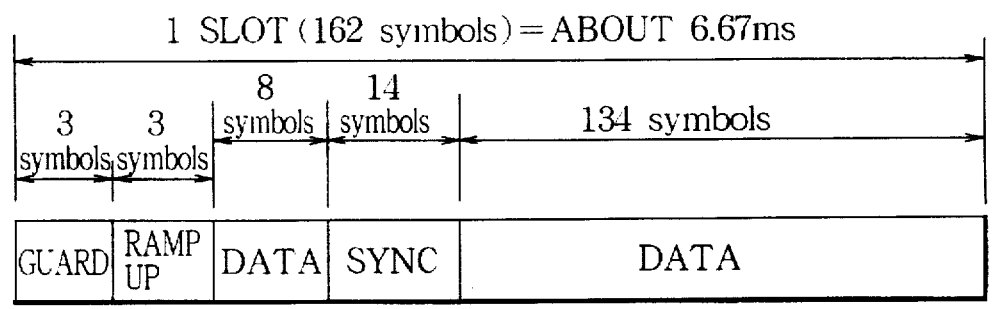
FIG. 5 is a diagram showing the configuration of one slot of a transmit signal at the wireless telephone.
Figure 6:
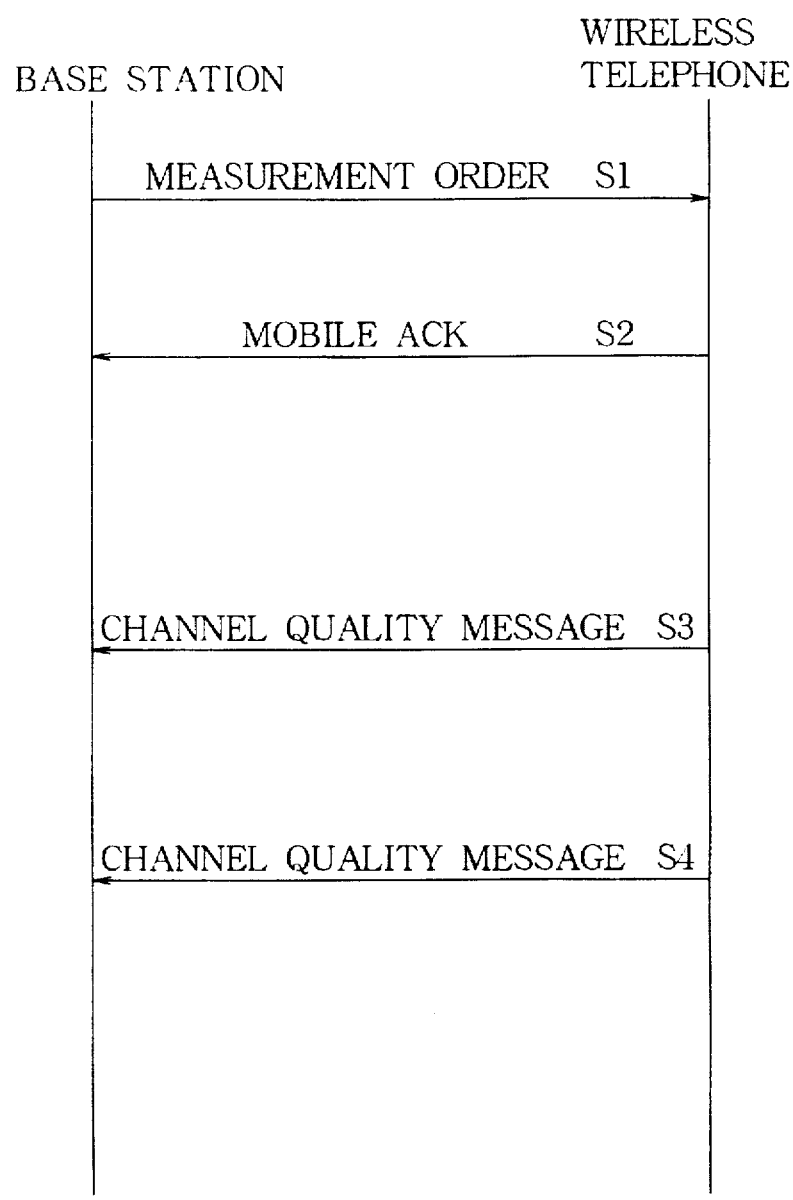
FIG. 6 is a diagram showing the protocol sequence in the MAHO operation between a base station and a wireless telephone, in a digital communication system of the TDMA system.
Figure 7A:
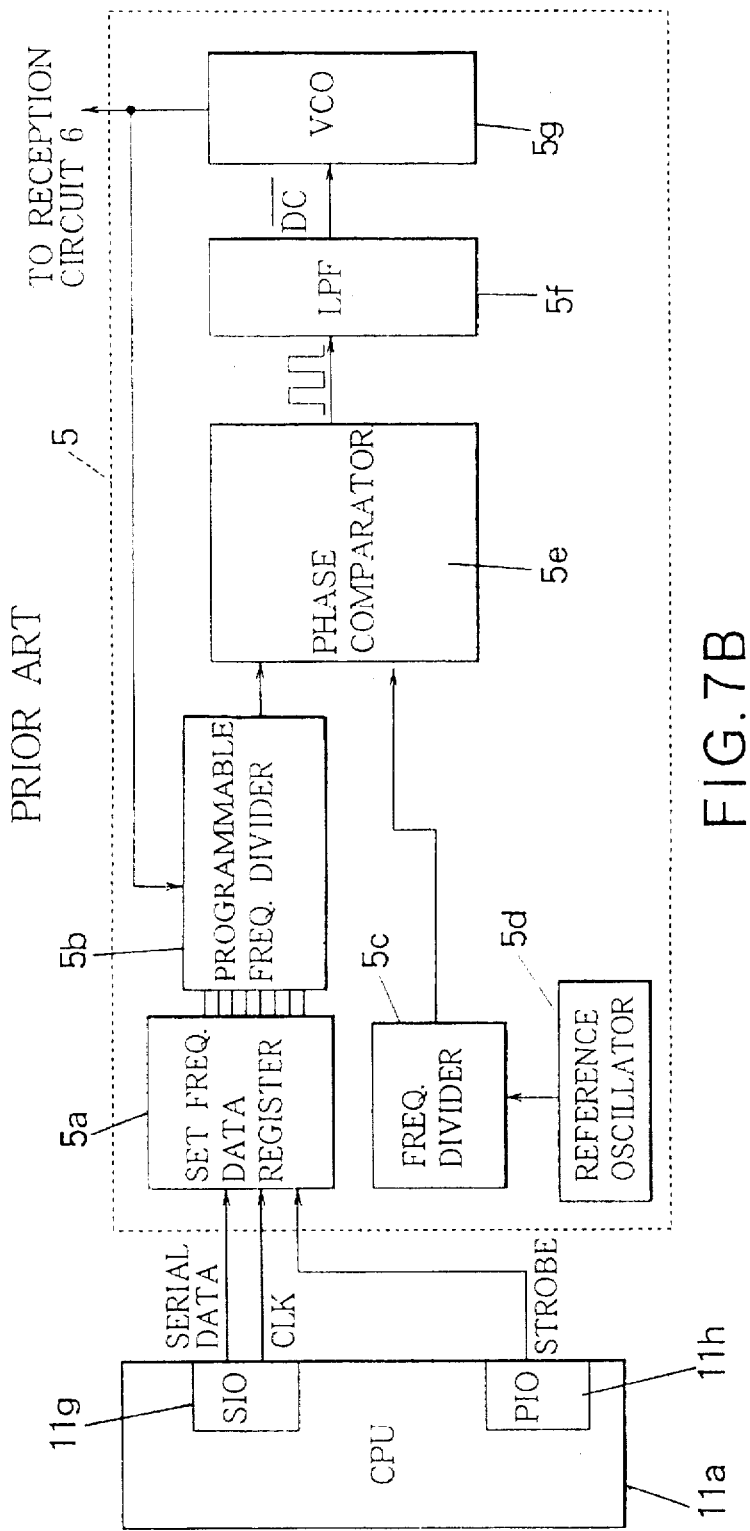
FIG. 7A is a block diagram showing the configuration of the reception PLL.
Figure 7B:
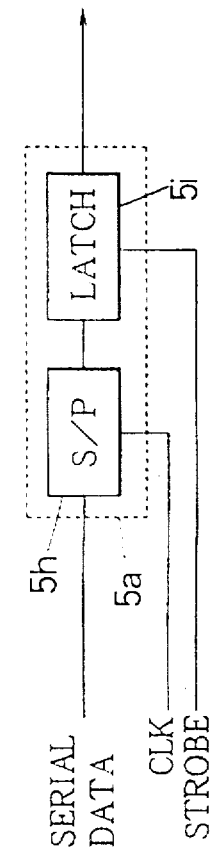
FIG. 7B is a block diagram showing an example of the set frequency data register 5a in FIG. 7A.
Figure 8A:
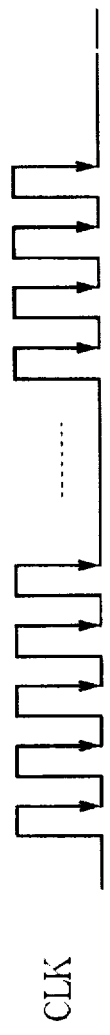
FIG. 8A to FIG. 8C are timing charts showing the process of alteration of the reception frequency at the reception PLL.
Figure 8B:
Figure 8C:
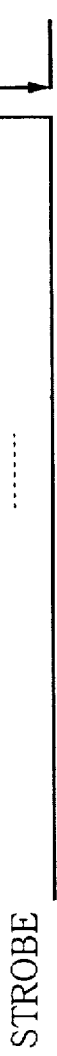
Figure 9:
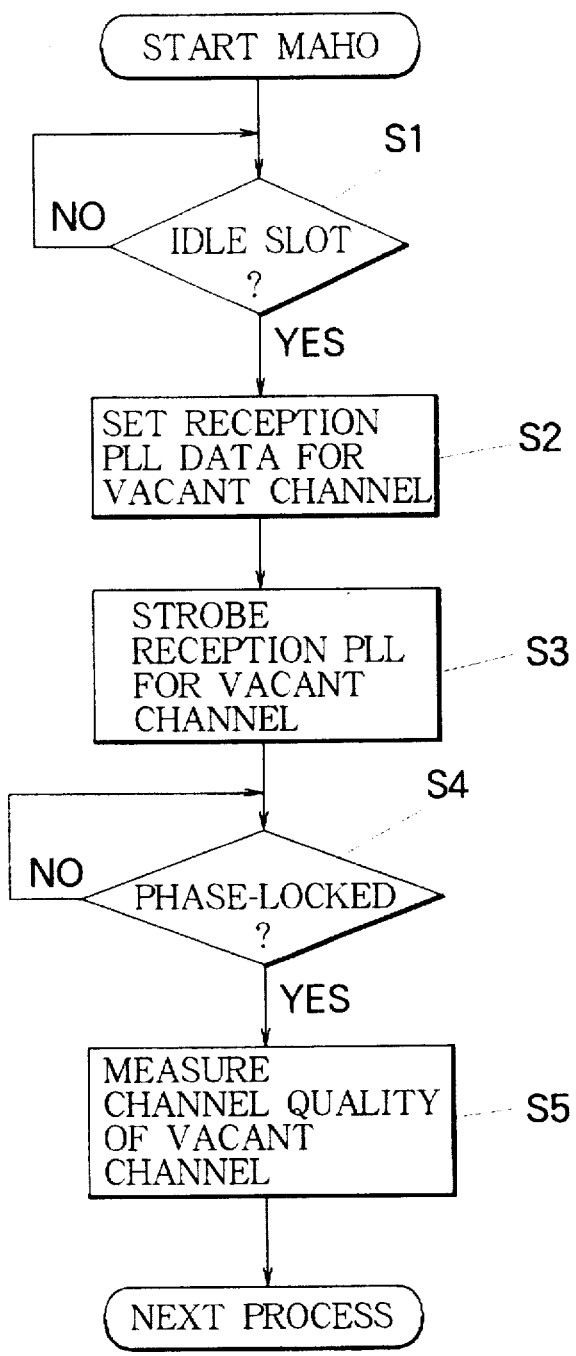
FIG. 9 is a flowchart showing the MAHO operation of the digital wireless telephone of the TDMA system in the prior art.
Figure 12:
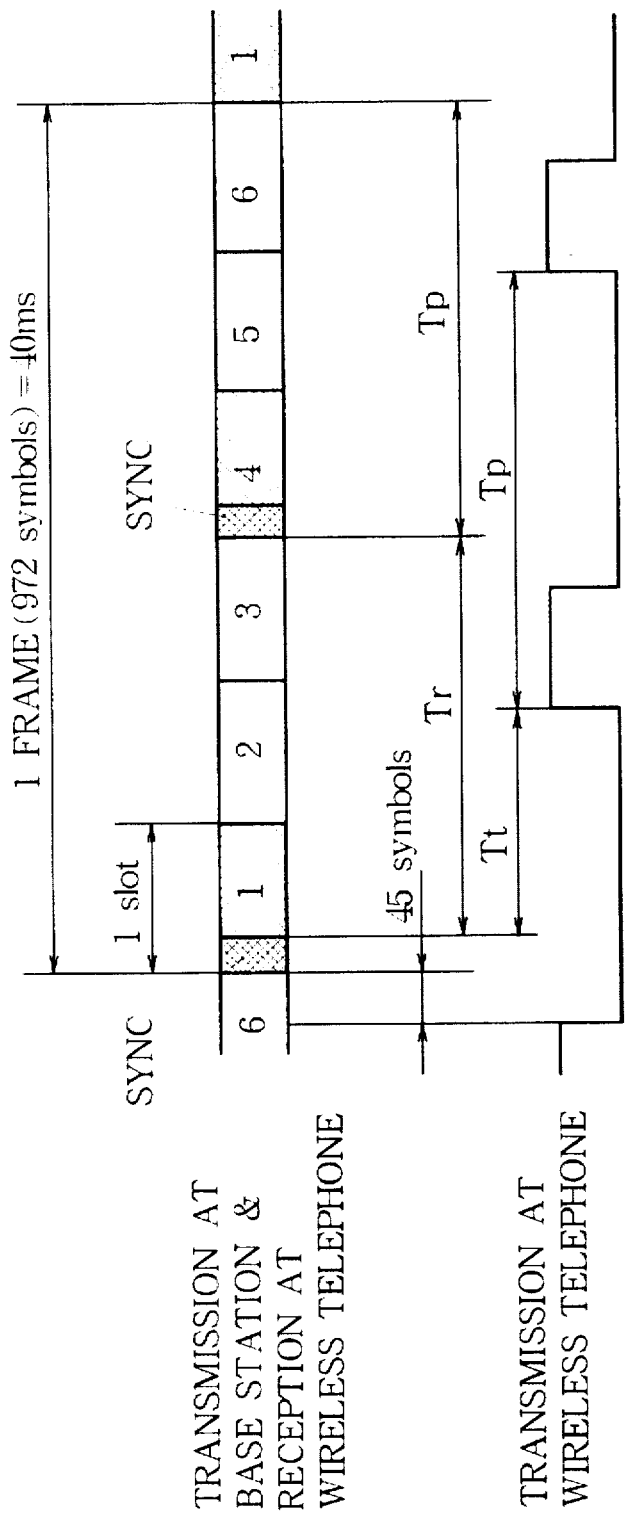
FIG. 12 is a diagram showing the timing of the TDMA operation in the mobile communication system of the TDMA system.

The hardware configuration of the wireless telephone of this embodiment is the similar to that shown in FIG. 1. However, the controller 11 of this embodiment has an additional function which is implemented by software. i.e., computer programs stored in a program memory 11b (FIG. 2).

As was described, the receive signal processor 9 notifies the controller 11 of the reception of a sync signal that has been detected in the receive signal.

Responsive to the sync signal in the receive signal, the controller 11 generates a transmission timing signal St indicating the timing of transmission at the next transmission cycle, and a reception timing signal Sr indicating the timing of reception of at the next reception cycle, and performs control over timing for autonomous transmission, to be later described in detail. The generation of the transmission timing signal St and reception timing signal Sr is achieved by measuring the time by reference to an internal oscillator 11g, i.e., by counting clock pulses generated from the internal oscillator 11g.

Specifically, the controller 11 generates the transmission timing signal St a predetermined time Tr (FIG. 12) after the detection of the sync signal, and generates the reception timing signal Sr a predetermined time Tr (FIG. 12) after the detection of the sync signal. When the sync signal is not detected, the controller 11 keeps generating the transmission timing signal St, with reference to the timing at which the sync signal was last detected, to continue the transmission until expiration of a predetermined time Ta.

When the sync signal is not detected, generation of the transmission timing signal St is repeated at a predetermined interval Tp, which is equal to the time length for three slots.

The overall effect is that the transmission timing signal St is generated Tt after the detection of the sync signal, and thereafter at an interval of Tp. Such continued generation of the transmission timing signal St at an interval Tp, measured on the basis of the clock internal to the wireless telephone, is called autonomous generation of the timing signal St, and is continued for a predetermined time Ta after the sync signal was last detected. When the predetermined time Ta has expired, the autonomous generation of the transmission timing signal St is stopped (and hence the transmission is halted). The reason for halting the transmission by means of the autonomous generation of the transmission timing signal is that the error in the transmission timing signal St accumulates with time, and may become intolerable, causing interference with the communication of other wireless telephones.

As an example, the length of the time Ta is 0.823 sec., as will be explained later.

The controller 11 also causes termination of communication when the sync signal is not detected for a predetermined time Tf, called fading time. This to stop communication when an adverse reception state continues. The time Tf is five sec. for example.

To perform the above operations, the RAM lid in the controller 11 of this embodiment has memory areas used as timers T1 to T4, as shown in FIG. 11B. The timers T1 and T4 are for measuring the times Tf and Ta, respectively. The timer T2 is for measuring the time Tt or Tp. The timer T3 is for measuring the time Tr or Tp.

The CPU 11a of the controller 11 writes the set values in the respective timers, and cause the timers to down-count in accordance with the internal clock, and when the value of each timer becomes zero, a time-out signal is generated.

Figure 13:
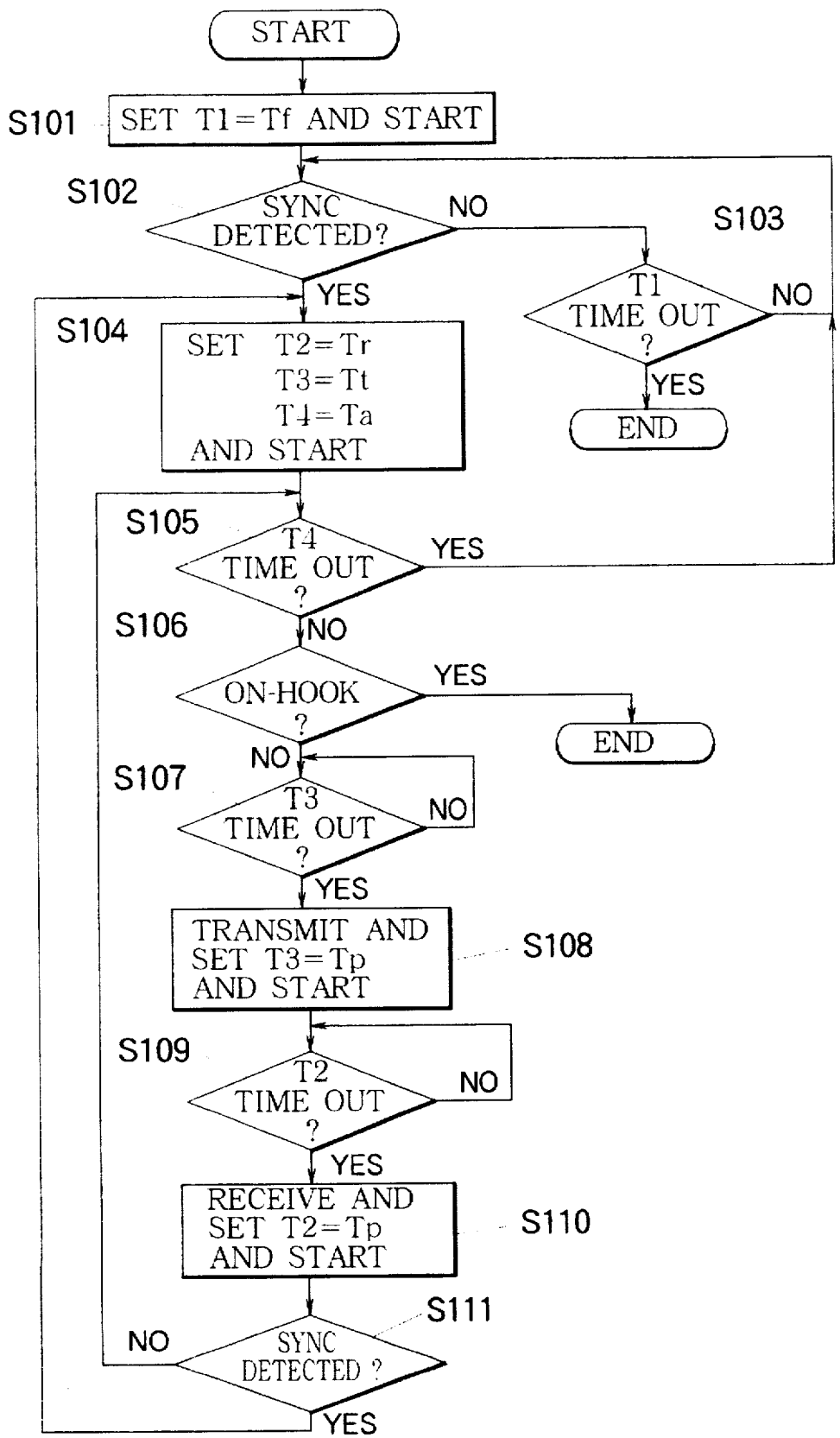
FIG. 13 is a flowchart showing the operation for the autonomous generation of the transmit timing signal according to the embodiment of FIG. 11A.

FIG. 13 shows the operation for determining the timing of the transmission and reception, in accordance with the computer program stored in the ROM 11b. This operation is started when the communication (call) is started.

First, at step S101, Tf is set in the fade timer T1, which is then started. Then, at step S102, and judgement is made as to whether a sync signal is detected in the receive signal. If it is not detected, then at step S103, whether the fade timer T1 has timed out. It it has not timed out, then the next step is step S102. If it has timed out, the communication is terminated.

If, at step S102, the sync signal is detected, then at step S104, Tf, Tr, Tt and Ta are set (or re-set), and the timers are started (or re-started).

Then, at step S105, judgement is made as to whether T4 has timed out. If it has timed out, then the next step is step S102. If it has not timed out, then the next step is step S106, where judgement is made as to whether an on-hook signal has been generated. If it has been made, the communication is terminated. If it has not been made, then CPU 11a waits for the transmission timing to come, by referring to the timer T3. When the transmission timing comes, then at step S108, transmission timing signal St is generated (causing the transmit signal processor 8 to perform the transmission), and Tp is set in the timer T3, which is then started.

At a next step S109, the CPU 11a waits for the reception timing to come. When the reception timing comes, then at step S110, reception is made, and Tp is set in the timer T2, which is then started.

At a next step S111, judgment is made as to whether the sync signal is detected in the receive signal.

If it is detected, the next step is step S104. If it is not detected, the next step is step S105.

It should be noted that if the sync signal is detected, the timers T2 and T3 are re-set with Tr and Tt (step S104), so that the next transmission and reception are made at timing Tt or Tr after the detection of the sync signal, while if the sync signal is not detected, the next transmission and reception are conducted at timing Tp after the preceding transmission or reception. When the sync signal is not detected, the voice signal processing is not performed.

However, the transmission of the signal at the step S108 may successfully reach the base station, and the one-way communication may be continued.

In this way, autonomous transmission may be continued for Ta after the last detection of the sync signal.

The length of Ta depends on the accuracy of the clock generator internal to the wireless telephone. As an example, consideration is given for a case according to the stipulation of IS-54.

The transmission burst of the wireless telephone is provided with a guard field of three symbols. The guard field is provided for avoiding interference between signals due to time shift of the timing of the transmission between different wireless telephones. With a safety margin, it can be said that an error of one symbol will not cause an interference. The time length at which the error may exceed one symbol is the maximum value of time Ta. The tolerance of the quarz oscillator generally employed is 50 ppm. The time at which the error is one symbol length if the error of the oscillator is 50 ppm can be set is Ta. Since the symbol rate is 24.3 k Symbols/sec., $$Ta = (1/24,300)/0.00005$$
$$= about\ 0.823\ sec.$$

As has been described according to the embodiment described with reference to FIG. 11A to FIG. 13, the wireless telephone can continue transmission, without being affected by the quality of radio channel from the base station to the wireless telephone. The base station can receive the signal transmitted from the wireless telephone, and the demodulated voice and the like are not interrupted. In particular, the quality of transmission of data from the wireless telephone can be improved.

Another embodiment of the invention will now be described. In the embodiment described below, the basic configuration and operation of the digital wireless telephone are the same as those of the prior art example described with reference to FIG. 1 to FIG. 8, and their description is not repeated. The assumption that the slots 1 and 4 are allocated to the wireless telephone in question also holds.

Figure 14:
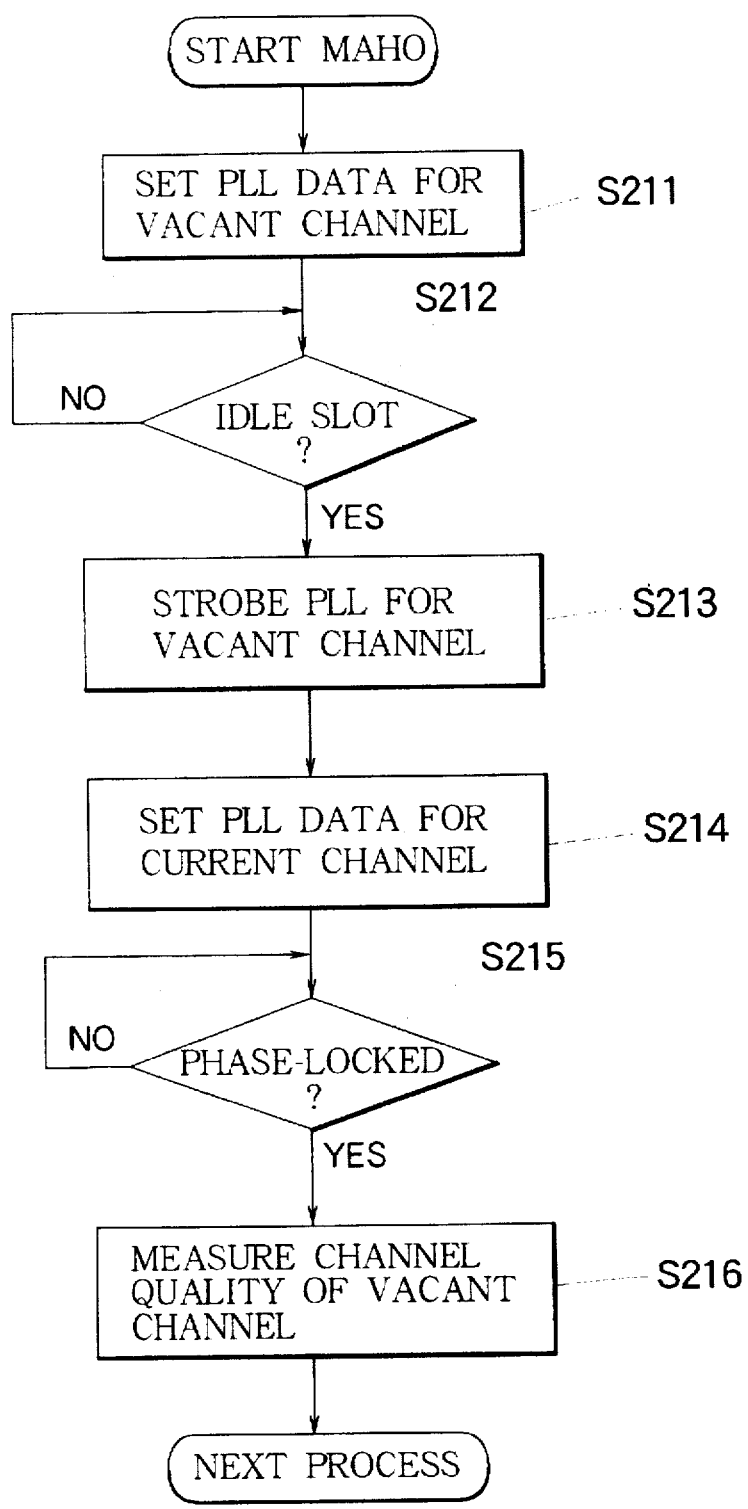
FIG. 14 is a flowchart showing the MAHO operation of the digital wireless telephone of the TDMA system of another embodiment of the invention.

FIG. 14 is a flowchart showing the MAHO operation of the CPU 11a of the wireless telephone of the TDMA system according the another embodiment of the invention. FIG. 15A to FIG. 15E are its timing charts.

When the CPU 11a receives a Measurement Order (S1 in FIG. 6), it sets serial reception PLL data at timing Dv (FIG. 15C) corresponding to the frequency of the vacant channel for which the measurement should be made, in the set frequency data register 5a in the reception PLL 5, before the idle slot 2 (step S211).

The CPU 11a then makes judgment as to whether it is now in an idle slot (slot 2 in FIG. 15B) (step S212). If it is found at the step S212 that it is now in an idle slot, then the reception PLL strobe signal (FIG. 15D) of one bit is supplied from the parallel input/output 11h of the CPU 11a to the set frequency data register 5a, and the strobe operation is conducted at timing STv (step S213).

Then, timing Dc, the serial reception PLL data corresponding to the frequency of the current channel is set from the serial input/output 11g of the CPU 11a to the set frequency data register 5a in the reception PLL 5 (step S214).

Then, at step S215, judgment is made as to whether the reception PLL 5 has been phase-locked with the reception frequency for the vacant channel having been set at step S211 and having been strobed at step S213. This can be achieved, by measuring the lock-up time t1.

Figure 15A:
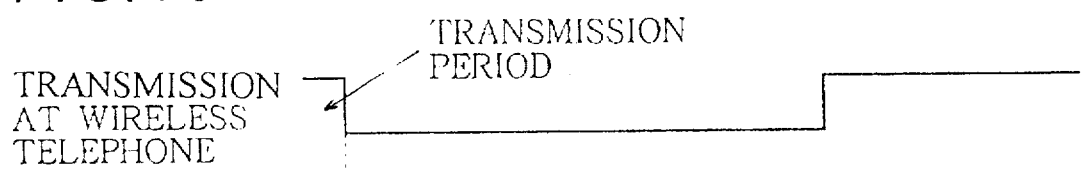
FIG. 15A to FIG. 15E are timing charts showing the operation of the CPU in the digital wireless telephone of the TDMA system of the embodiment of FIG. 14.
Figure 15B:
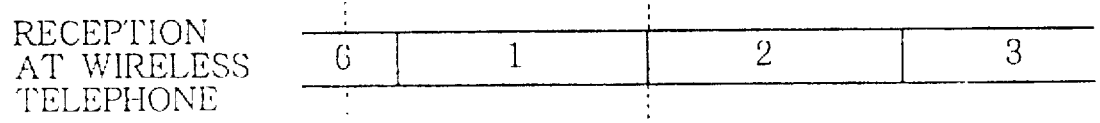
Figure 15C:
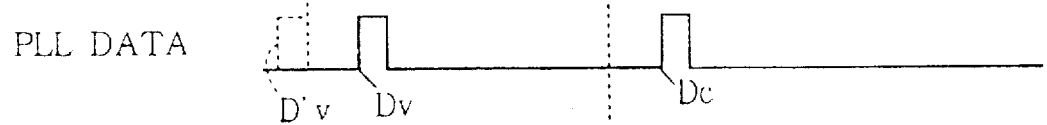
Figure 15D:
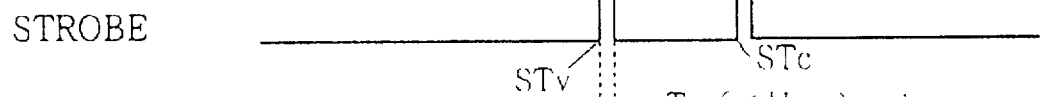
Figure 15E:

When it is judged that the phase-lock has been attained, then at step S216, the measurement of the channel quality of the vacant channel is effected at timing Mv in FIG. 15E.

After the measurement for the vacant channel is completed, the reception PLL strobe signal (FIG. 15D) of one bit is supplied to the parallel input/output 11h of the CPU 11a to the set frequency data register 5a, at timing STc. Then, judgment is made as to whether the reception PLL 5 has been phase-locked, by measuring the predetermined lock-up time.

When it is found that the phase-lock has been attained, the measurement of the channel quality for the current channel is effected at timing Mc in FIG. 15E.

The wireless telephone repeats the measurement of the channel qualities of the vacant channel and the current channel and transmits the results of the measurement until it receives a message from the base station commanding that the MAHO operation should be terminated.

As has been described, according to the above-described embodiment, the reception PLL data for the vacant channel for which the measurement should be made is set in the set frequency data register 5a prior to the idle slot, and reception PLL data for the current channel is set in the set frequency data register 5a during the idle slot and while the lock-up of the reception PLL for the vacant channel is executed. As a result, the time until the completion of the measurement for the vacant channel and current channel of the MAHO operation is essentially the sum of the time for the lock-up and measurement for the vacant channel and the time for lock-up and measurement for the current channel after the commencement of the idle slot. Thus, it is completed sooner than in the prior art by the time required for setting the reception PLL data for the vacant channel in the data register 5a.

Accordingly, even if the serial reception PLL data is transferred from the CPU 11a to the data register 5a at a low transfer speed, the measurement of the channel qualities of the vacant channel and the current channel can be completed within the stipulated measurement time (11 msec.), and the requirement of the MAHO timing can be met.

Moreover, since it is not necessary to increase the transfer speed of the reception PLL data, generation of the noises can be prevented, and degradation in the transmitted voice quality and the data communication quality can be avoided, and satisfactory reception can be continued.

The above-mentioned embodiment however has the following problem. That is, the timing for writing the reception PLL data for the vacant channel in the reception PLL 5 before the idle slot 2 may be within a transmission period for the wireless telephone in question, as indicated by dotted line Dv' in FIG. 15C, and electrically affect the operation of the transmitting circuit 6 (FIG. 1).

More specifically, the clock (FIG. 8A) for setting the data from the CPU 11a to the set frequency data register 5a in the reception PLL 5 has an amplitude of 5 V, and affects the operation of the transmitting circuit 6, and causes fluctuation of the transmission frequency. This appears as noises in the transmitted voice and data, and leads to degradation of the transmitted voice quality and interference in the data transmission. If the PLL data is set during the reception slot of the current channel, the receiving circuit is affected by the clock, and erroneous operation may be caused. The CPU 11a must carry out the control over the setting of the PLL data, concurrently with the control over the reception of the signal from the base station.

Figure 16A:
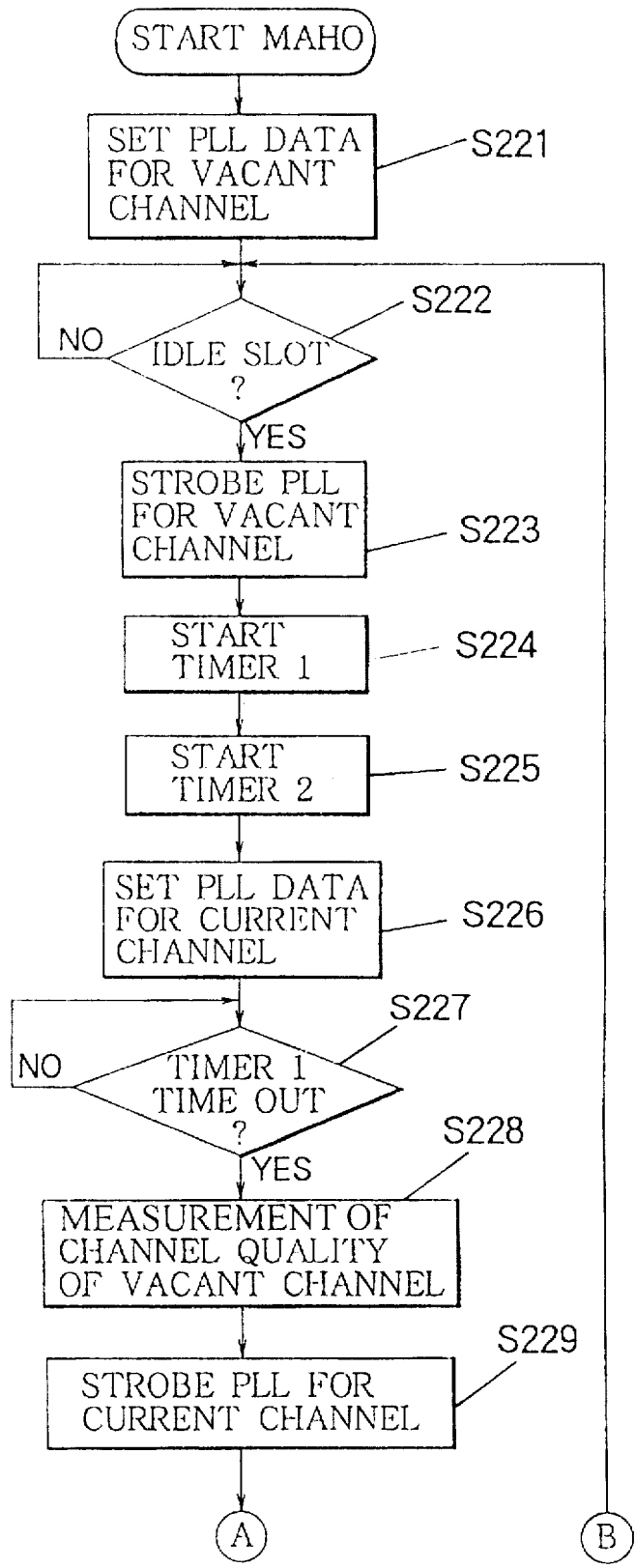
FIG. 16A and FIG. 16B are flowcharts showing the MAHO operation of the digital wireless telephone of the embodiment of FIG. 14 of another embodiment of the invention.
Figure 16B:
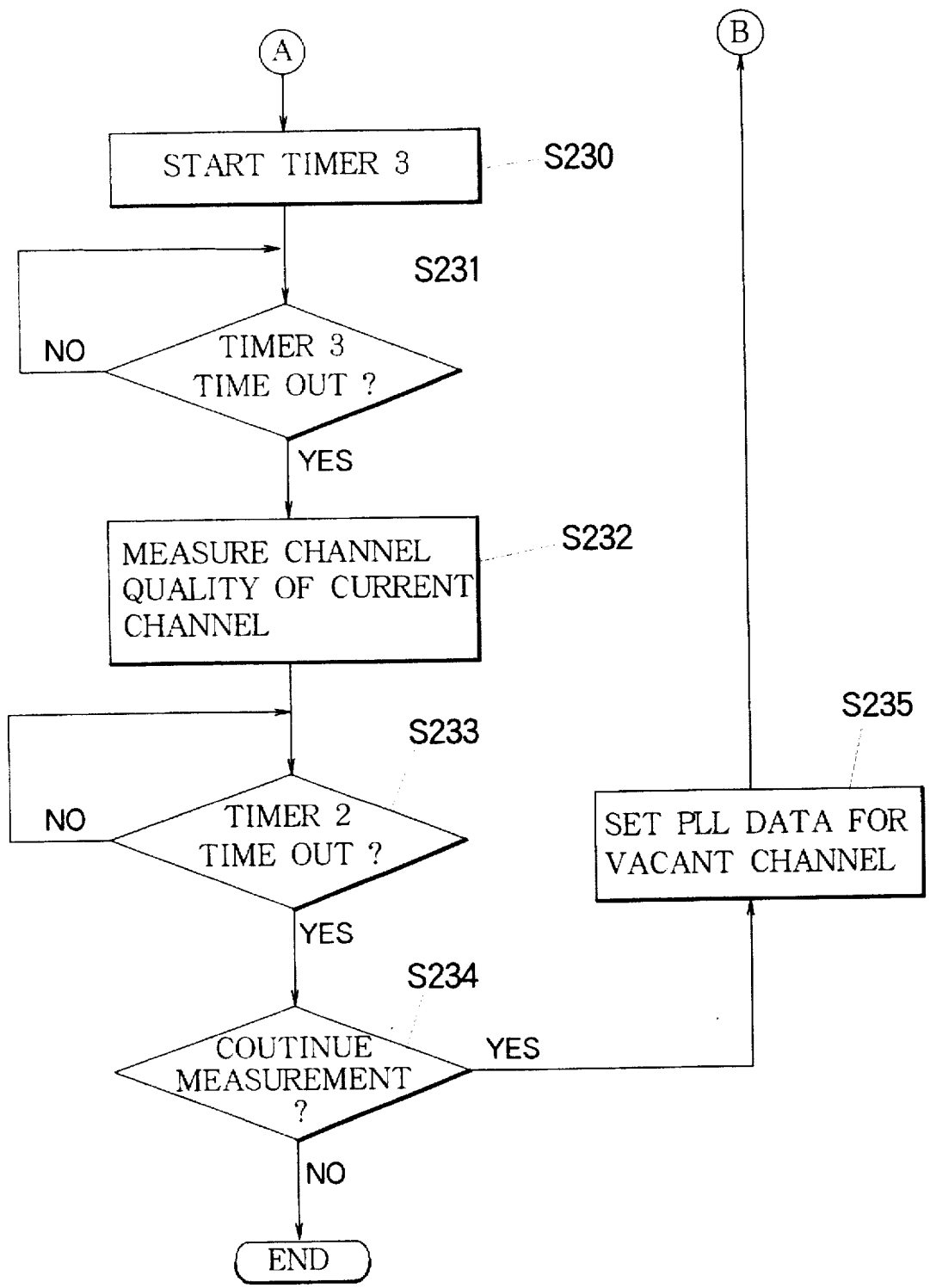

An embodiment described below with reference to FIG. 16A to FIG. 17E is to solve this problem. FIG. 16A and FIG. 16B are flowcharts of the MAHO operation of the CPU 11a of the wireless telephone of the TDMA system according to this embodiment. FIG. 17A to FIG. 17E are its timing charts.

When the CPU 11a receives a Measurement Order (Sl in FIG. 6) from the base station, then at step S221, the CPU 11a sets reception PLL data corresponding to the frequency of the vacant channel for which the measurement should be made, in the set frequency data register 5a in the reception PLL 5, during the slot for vacant channel (slot 6 in FIG. 17B) at timing Dv (step S221).

The CPU 11a then makes judgment whether it is now in an idle slot (slot 2 in FIG. 17B) (step S222). If it is found that it is now in an idle slot at step S222, then the reception PLL strobe signal (FIG. 17D) of one bit is supplied from the parallel input/output 11h of the CPU 11a to the set frequency data register 5a, and the strobe operation is effected at timing STv (step S223).

Simultaneously with the strobe processing, a first timer (implemented at the controller 11 by a software) for measuring the lock-up time t1 of the reception PLL 5 is started (step S224), and a second timer (implemented at the controller 11 by a software) for measuring the time t2 predetermined to expire during a period between the transmission period and the reception slot of the current channel is started (step S225).

Then, at step S226, the serial reception PLL data (FIG. 17C) corresponding to the frequency of the current channel is set from the serial input/output 11g of the CPU 11a to the set frequency data register 5a in the reception PLL 5 at timing Dc.

Then, at step S227, judgment is made as to whether the lock-up time t1 measured by the first timer has expired. If the expiration is detected, then at step S228, the measurement of the channel quality of the vacant channel is conducted at timing Mv in FIG. 17E.

When the measurement of the vacant channel is completed, the reception PLL strobe signal (FIG. 17D) of one bit is supplied from the parallel input/output 11h of the CPU 11a to the set frequency data register 5a, and the strobe processing is conducted at timing STc (step S229).

Simultaneously with the strobe processing, a third timer (implemented at the controller 11 by a software) for measuring the lock-up time t3 of the reception PLL 5 is started (step S230).

Then, at step S231, judgment is made as to whether the lock-up time t3 measured by the third timer has expired. When the expiration is detected, then at step S232, the measurement of the channel quality of the current channel is conducted at timing Mc in FIG. 17E.

Then, at step S233, judgment is made as to whether the predetermined time t2 measured by the second timer has expired. When the expiration is detected, then judgment is made as to whether a message for terminating the MAHO operation is received from the base station (step S234).

If it is found that the MAHO operation should be continued, then at the timing Dv of expiration of the predetermined time t2. i.e., at a timing Dv between the transmission period and the current channel reception slot (slot 4), the serial reception PLL data M7 (FIG. 17C) corresponding to the channel of the vacant channel for which the measurement should be made is set in the set frequency data register 5a in the reception PLL 5 (step S235). The process then returns to the step S222.

The wireless telephone repeats the measurement of the channel qualities of the vacant channel and the current channel, and transmission of the results of the measurement to the base station until it receives a message for terminating the MAHO operation.

As has been described, according to the embodiment of FIG. 16A to FIG. 17E, the predetermined time is measured using the second timer to conduct the setting of the PLL data for the vacant channel in the data register 5a during a period between the transmission period and the current channel reception slot.

As a result, the influence of the transfer clock on the transmitting circuit and the receiving circuit is eliminated, and generation of noises in the transmitted voice and data can be prevented. For this reason, in addition to the effects of the first embodiment described above, it is possible to conduct satisfactory transmission without degrading the transmitted voice quality and data communication quality. Moreover, erroneous operation due to the clock may be prevented.

In the above embodiment, the PLL data is set during a period other than the transmission period as well as the reception slot. However, the PLL data may be set at a time which is other than the transmission period but may be in the reception slot. Still alternatively, the PLL data may be set at a time which is other than the reception slot but may be in the transmission period.

In the embodiment of the programmable frequency divider 5b is used for dividing the output of the voltage controlled oscillator 5g, and the frequency division factor of the programmable frequency divider 5b is controlled in accordance with the PLL data from the CPU 11a. As an alternative, the frequency divider 5c may be replaced by a programmable frequency divider, and its frequency division factor may be controlled in accordance with the PLL data from the CPU 11a. In such a case, the programmable frequency divider 5b may be replaced by a frequency divider with a fixed frequency division factor.

Figures 18, 19:
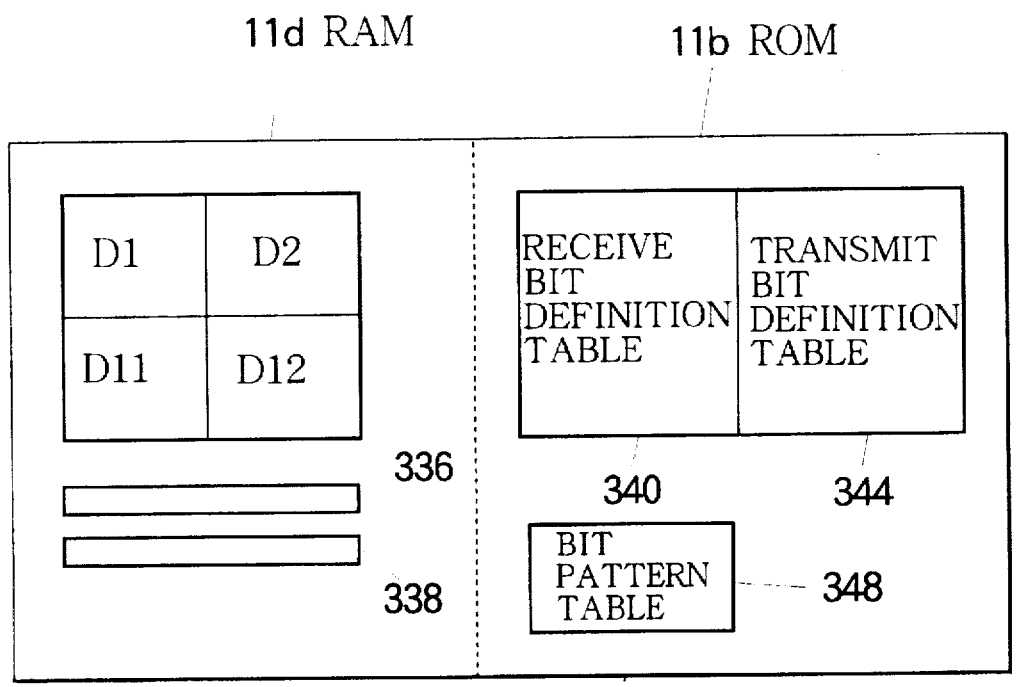
FIG. 18 is a diagram showing the memory areas in the RAM 11d and ROM 11b in a further embodiment of the invention.
FIG. 19 is a diagram showing the configuration of the bit stream data transmitted to the wireless telephone.

A further embodiment of the invention will now be described with reference to FIG. 18 to FIG. 32 as well as FIG. 1. The hardware configuration of the wireless telephone of this embodiment is as shown in FIG. 1. The RAM 11d and ROM 11b of this embodiment has the memory areas as illustrated in FIG. 18.

The RAM 11d contains receive bit stream data memory D1, receive byte stream data memory D2, transmit byte stream data memory D11 and transmit bit stream data memory D12, bit sequence operation register 336 and type register 338.

The ROM 11b contains a receive bit definition table 340 including control message tables, one of which, 342, is shown in FIG. 22. The control message tables are prepared individually for respective message types. The ROM 11b also contains a transmit bit definition table 344 including instruction message tables, one of which, 346, is shown in FIG. 25. The instruction message tables are prepared for respective instruction messages. The ROM 11b further contains a bit pattern table 348, shown in further detail in FIG. 28.

The basic functions of the respective circuits of this embodiment are the same as those described in connection with the prior art example of FIG. 1. Further description will be made of the functions of some of the circuits which relate to the features of this embodiment.

The receiving circuit 6 includes a data demodulator and a discriminator (neither being illustrated), and forward digital traffic channel (FDTC) messages output from the discriminator are supplied to the receive signal processor 9.

The FDTC messages are control data from the base station to the wireless telephone, and are received in the form of bit stream data. The FDTC messages received at the receive signal processor 9 are supplied to the CPU 11a in the controller 11. The CPU 11a supplies the transmit signal processor 8 with reverse digital traffic channel (RDTC) messages. The transmit signal processor 8 encodes the RDTC messages, and then supplies them to the transmitting circuit 3. The transmitting circuit 3 includes a data modulator (not illustrated), and transmits the RDTC messages, in the form of bit stream data. The RDTC messages are control data (base station control data) from the wireless telephone to the base station.

An example of format of FDTC message (wireless telephone control) data is shown in FIG. 19. As illustrated, the first field Pr consisting of two bits is a protocol discriminator, and indicates the type of the protocol (IS54). The next field Msg of 8 bits is a message type, and indicates the type of the message. The contents of and the number of the remaining bits differ from one type of message to another.

An example of one type of FDTC message of the format of FIG. 19 is shown in FIG. 20A in byte expression and in FIG. 20B in bit expression. The message type field (Msg) which is shown to be "11011100" indicates the particular message type, which is for commanding hand-off.

The FDTC message data in the form of bit stream digital data are supplied from the CPU 11a, and stored in the receive bit stream data memory D1. The CPU 11a then converts the FDTC message data stored in the receive bit stream data memory D1 into a byte stream data shown in FIG. 20C, and stores them in the receive byte stream data memory D2. The operation for receiving the FDTC data will next be described with reference to FIG. 21.

When the CPU 11a stores, in the receive bit stream data memory D1, the FDTC data in the form of the bit stream data from the receive signal processor 9, it then performs various initializations for conversion of the bit stream data into the byte stream data. That is, at this step S301, the CPU 11a sets, in appropriate registers not shown, the initial addresses for accessing the bit stream data memory D1 and the byte stream data memory D2, and also initializes a bit sequence operation register 336 in the RAM 11d. The bit sequence operation register 336 is used for extracting data of an arbitrary number of bits from arbitrary bit positions in the bit stream data memory D1.

At step S302, the CPU 11a extracts the protocol discriminator Pr at the first two bits, by means of the bit sequence operation register 336, from the bit stream data stored in the receive bit stream data memory D1, and sets it in a type register 338 in the RAM 11d.

At step S303, the message type (Msg) at the next eight bits is extracted, and set in the type register 338. The CPU 11a identifies the message type according to the value of the 8 bits (MSG) stored in the type register 338, and determines, according to the result of the identification, which of the tables in the receive bit definition table 340 in the ROM 11b should be used.

In the example shown in FIG. 19, the eight bits in the message type field (Msg) are "11011100" indicating a command for hand-off, so that the CPU 11a designates the control message table 342 which is one of the control message tables contained in the receive bit definition table 340 (FIG. 22) and which is for the command for hand-off.

Tables similar to that of FIG. 22 are provided for the respective message types.

The table in FIG. 22 shows how the bit data (bits other than the bits in the Pr and Msg fields) in the bit stream stored in the receive bit stream data memory D1 should be processed, for conversion, and storage in the receive byte stream data memory D2. Each line or row in the table shows how each group of bits or bit should be processed. The bit type of each group of bits or bit is indicated in the column "BIT TYPE". The number of bits belonging to each group of bits or bit is indicated in the column "NUMBER OF BITS (no)", and the memory location in the receive byte stream data memory D2 into which each byte data obtained by conversion from each group of bits or bit should be stored is indicated in the column "MEMORY LOCATION (pos)". The order of the rows (as counted from the top of the table) corresponds to the order of the group of bits or bit in the bit sequence in the bit stream data.

The last row of the table contains the data, DATA-END, indicating the end of the bit stream.

In the control message table 342 shown in FIG. 22, only two bit types (BIT-MSG and BIT) are shown. Other bit types may be present in other types of messages, and hence in the tables for such other types of messages.

The first row in the table 342 of FIG. 22 indicates that the group of eleven bits at the head of the sequence of bits (other than Pr and Msg) is of the type "BIT", the byte data obtained by conversion should be stored in the "chan" area within the receive byte stream data memory D2, and the "chan" area is formed starting at the first byte in the receive byte stream data memory D2.

The second row in the table 342 indicates that the group of one bit next to the above-mentioned eleven bits is of the bit type "BIT", the byte data obtained by conversion should be stored in the "rate" area in the receive byte stream data memory D2, and the "rate" area is formed starting at the third byte in the receive byte stream data memory D2.

The third row in the table 342 indicates that the group of three bits next to the above-mentioned one bit is of the type "BIT-MSG", the byte data obtained by conversion should be stored in the "slot" area in the receive byte stream data memory D2, and the "slot" area is formed starting at the fourth byte in the receive byte stream data memory D2.

The remaining rows in the table 342 give similar indications.

Returning to FIG. 21, at step S304, the CPU 11a identifies the bit type of the group of bits or bit being processed according to the designated row (k-th row) in the control memory table 342. In a practical design of the telephone, the step S304 is to find which of the 12 bit types is indicated by the particular row of the table being used.

If the group of bits or bit is of the bit type "BIT", then the step S312 is followed. If the group of bits or bit is of the type "BIT-MSG", then the sequence of steps S306, S308, S309 and S310 are followed. For other bit types (Ya to Yj), the corresponding or appropriate one of other steps (or sequences of steps) S311a to S311j is performed. If the data "DATA-END" is read from the table, the processing is stopped.

Figure 21:
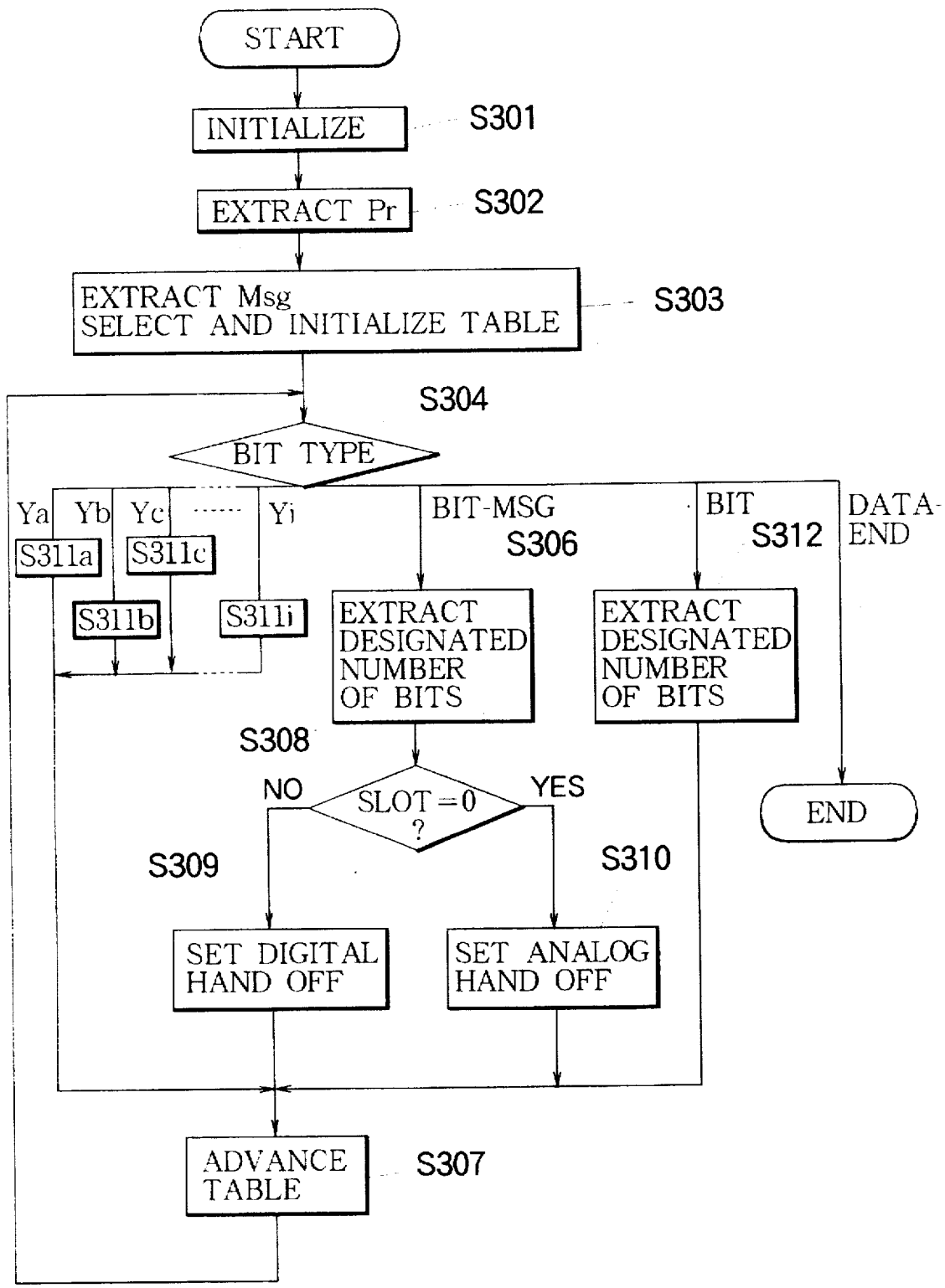
FIG. 21 is a flowchart showing the operation for converting the received bit stream data into byte stream data.

For simplicity of illustration and description, the process steps for two bit types which appear in the particular example of the messages shown in FIG. 19 are illustrated in detail in FIG. 21, and will be described in detail, and description of the steps (or sequences of steps) S111a to S111j is omitted.

As explained above, the first row in the control memory table 342 is for bit type BIT, so that, at the step S304, the step S312 is selected. In this step S312, the CPU 11a extracts the designated number of bits (11 bits) at the head of unprocessed part of the bit stream, i.e., next to the Msg field, in the receive bit stream data memory D1, by means of the bit sequence operation register 336, and stores the extracted data in the designated memory location, i.e., the "chan" area, of two bytes, in the receive byte stream data memory D2. Two bytes consist of 16 bits, and the remainder of bits (16 bits minus 11 bits) are filled with arbitrary bits (either "0" or "1"). In the example described later, the remaining bit positions are filed with "0".

When the step S312 is completed, then at the step S307, the control message table 342 is advanced, i.e., a pointer, not shown, is changed to point to the next row in the table 342. This is in preparation for processing the next bit group in the bit stream data.

The bit type of the next bit group designated by the next row in the control message table 342 is also "BIT", so that the step S312 is selected, and the CPU 11a extracts the designated number of bits (a single bit) at the head of unprocessed part of the bit stream, i.e., next to the group of 11 bits having been processed, in the first receiving memory D1, by means of the bit sequence operation register 336, and stores the extracted data in the designated memory location, i.e., "rate" area in the receive byte stream data memory D2. Again the remaining 7 bit positions are filled with arbitrary bits. At the step S307, the control message table 342 is advanced in preparation for processing the next bit group in the bit stream data.

The bit type of the next bit group designated by the next row in the control message table 342 is "BIT-MSG", so that the sequence of steps S306–S310 are selected. At the step S306, the CPU 11a extracts designated number of bits (3 bits) at the head of unprocessed part of the bit stream data in the receive bit stream data memory D1, by means of the bit sequence operation register 336, and stores them in the designated memory location, i.e., in the "slot" area in the receive byte stream data memory D2. At the step S308, the CPU 11a checks whether the value of "slot" is "0". If it is not "0", then at the step S309, a digital hand-off code "16" is set in the reception type area, not shown, in the receive byte stream data memory D2. If the value of "slot" is "0" at the step S308, an analog hand-off code "17" is set in the reception type area. The value of "slot" is "0" in the case of hand-off to analog system (AMP standard employed in the U.S.). After the step S309 or S310, the control message table 342 is advanced (step S307).

The above-described steps are repeatedly executed until the data is "DATA-END" is read from the control message table 342. By then, all the bits of the bit stream, except those of Pr and Msg fields have been converted into byte stream data and stored in the receive byte stream data memory D2. The thus-obtained byte stream data are used for performing control over the wireless telephone. The operation within the wireless telephone is performed under control of a software, which is designed to handle byte stream data. That is, converting the bit stream data into byte stream data, prior to executing the commands from the base station is advantageous since the software for executing the commands is simpler, and the ROM storing the software can be of a smaller capacity.

An example of the base station control message, i.e., RDTC message is shown in FIG. 23A to FIG. 23C.

Any the RDTC message is created by the CPU 11a, and stored, in the form of byte stream data in the transmit byte stream data memory D11 in the RAM 11d. An example of the byte stream data is shown in FIG. 23A. The CPU 11a converts the byte stream data into bit stream data. The bit stream data corresponding to the byte stream data of FIG. 23A is shown in FIG. 23B in byte expression and in FIG. 23C bit expression. The bit stream data is stored in the transmit bit stream data memory D12. The bit stream data is supplied from the transmit bit stream data memory D12 to the transmit signal processor 8.

Of the RDTC message in the form of bit stream data, the first field Pr of two bits is a protocol discriminator, and the second field Msg of eight bits is a transmitted message type indicating the type of the transmitted message. The next field Rem-Len of six bits indicates the number of additional bytes transmitted subsequently. The contents and the number of the remaining bits differ from one type of message to another.

Each of the packets forming the RDTC message consists of 48 bits, and when any of the bits are unused, they are filled with two zero-bits and one or more filler octets "00001110". If less than eight bits remain after the two zero bits or after the last full octect, only part of a filler octet may be used for filling the remaining bits.

Referring now to FIG. 24, the operation for generating and converting RDTC data will be described.

When the CPU 11a stores, in the transmit byte stream data memory D11, the RDTC data in the form of byte stream data shown in FIG. 23A, it then performs various initializations, for conversion of the byte stream data into bit stream data. That is, at the step S321, the CPU 11a sets initial values of the addresses, in appropriate registers not shown, for accessing the transmit byte stream data memory D11 and the transmit bit stream data memory D12, and initializes the bit sequence operation register 336.

During conversion of byte stream data into bit stream data, the bit sequence operation register 336 is used for reading the data from the transmit byte stream data memory D11.

At the step S322, the protocol discriminator Pr of two bits is set in the transmit bit stream data memory D12, i.e., in the Pr field of two bits at the head of the area for the bit stream data in the transmit bit stream data memory D12.

The CPU 11a, then referring to the type field "type" of the byte stream data, identifies the message type, and selects one of the tables in the transmit bit definition table 344 preset in the ROM 11b. In accordance with the information on the message type in the byte stream data, the CPU 11a also sets the transmitting message type in the transmit bit stream data memory D12, i.e., it writes eight bit data representing the message type, in the Msg field of eight bits next to the field of two bits for the protocol in the transmit bit stream data memory D12.

The transmit bit definition table 344 includes a plurality of instruction message tables for the respective message types. In the example illustrated in FIG. 23, the code "72" is set in the type field, i.e., type=72. This means that the message to be transmitted is a "disconnect message" and the CPU 11a designates a corresponding instruction message table 346 (FIG. 25) included in the transmit bit definition table 344.

Tables similar to that of FIG. 25 are provided for the respective message types.

The CPU 11a then skips the fixed number of bits (six bits) of the Rem-Len field in the transmit bit stream data memory D12. The Rem-Len field will later be filled with a value indicating the number of bytes of the remainder of the bit stream data, i.e., part of the bit stream data after the Rem-Len field. The value of Rem-Len is determined by dividing the number of bits by eight, with any remaining bit or bits being raised to one byte.

Referring to FIG. 25, set in the instruction message table 346 are bit type (PARA-TYPE3, NUM-VAR1, BIT and DATA-END), the number of bits for each of them (or the data value), and the memory locations in the transmit byte stream data memory D11, from which the byte stream data are to be extracted for the conversion.

The table shown in FIG. 25 shows how each group of bits or bit forming the bit stream data other than Pr, Msg and Rem-Len is to be produced from the byte stream data.

For instance, the first row in the table of FIG. 25 indicates that the data which should be set in the field next to the field Rem-Len in the area in the transmit bit stream data memory D12 is of the bit type PARA-TYPE3, and should be formed of four bits ("0001") representing a value given in the column "no", which is shown to be "1".

The second row in the table of FIG. 25 indicates that the data which should be set in the next field (field next to the field filled with the data by the preceding process is of the bit type NUM-VAR1, and should be formed of the number of bits ("000001") designated by the value in the column "no" (which is shown to be "6") and representing the value given in the column "pos", which is shown to be "1".

The third row in the table of FIG. 25 indicates that the data which should be set in the next field (field next to the field filled with the data by the preceding process is of the bit type BIT, and should be formed of the number of bits designated by the value in the column "no" (which is shown to be "4") and representing the value stored in the area "reason" in the second byte of the transmit byte stream data memory D11.

The last row in the table of FIG. 25 indicates the end of the bit stream data.

Referring again to FIG. 24, at the step S325, the CPU 11a identifies the bit type of the data (group of bits) processed according to each row in the instruction message table 346.

In a practical design of the telephone, the step S325 is to find which of the 12 bit types is indicated by the particular row of the table being used.

If the data being processed according to the particular row is of the bit type "BIT", then the step S329 is followed. If the data being processed according to the particular row is of the type "PARA-TYPE3" then the step S330 is followed. If the data being processed according to the particular row is of the type "NUM-VAR1", then the step S328 is followed. For other bit types Za to Zi, the corresponding or appropriate one of other steps (or sequences of steps) S326a to S326i is performed. If the data "DATA-END" is read from the table, the processing is stopped.

For simplicity of illustration and description, the process steps for three bit types (BIT, PARA-TYPE3, NUM-VAR1 which appear in the particular example of the message shown in FIG. 23 are illustrated in detail in FIG. 24, and will be described, and details of steps (or sequence of steps) S326a to S326i are omitted.

As explained above, the data processed according to the first row in the instruction message table 346 is for bit type PARA-TYPE3, so that, at the step S325, the step S330 is selected. In this step S330, the CPU 11a sets the value "0001" of four bits representing the value of "no" (which is shown to be "1") in the column "no" in the table 346. At the step S331, the instruction message table 346 is advanced in preparation for processing according to the next row in the table 346, to produce the data for the next field of the bit stream data.

The data processed according to the next row in the instruction message table 346 is "NUM-VAR1", so that at the step S325, the step S328 is selected. At the step S328, the CPU 11a sets the value "000001" of the number of bits (six bits, in the example shown) designated by the value in the column "no", and representing the the value "1" in the column "pos" of the instruction message table 346, in the field next to the field filled with the data by the preceding process. At the next step S331, the instruction message table 346 is advanced in preparation for processing according to the next row in the table 346.

The data processed according to the third row in the instruction message table 346 is "BIT", so that, at the step S325, the step S329 is selected. At the step S329, the CPU 11a extracts the data from the designated area "reason" in the transmit byte stream data memory D11, with the number of extracted bits (which is "four") being designated by the value in the column "no" in the instruction message table 346, and sets the extracted data in the transmit bit stream data memory D12. At the next step S331, the instruction message table 346 is advanced in preparation for processing for the next row in the table.

When the data "DATA-END" is read from the instruction message table 346, then at the step S325, the step S332 is selected. At the step S332, the CPU 11a calculates the total number of bits as well as the number of bytes subsequent to the filed Rem-Len, and sets the calculated number of bytes in the field Rem-Len in the transmit bit stream data memory D12, and inserts two zero bits, and filler octets "00001110", in the remaining part of the 48-bit packet, subsequent to the last field filled by the processing according to the table 346. The "total number" of bytes mentioned above does not count the two zero bits and the filler octets, nor the bits in or before the field Rem-Lem. In the example of FIG. 23A to FIG. 23C, the number of bits for the fields Para, Num-Var, and Reason, the total number of bytes is 16, and the total number of bytes is 2. The six-bit binary value "000010" (indicating "2") is therefore entered in the field "Rem-Len", as shown in FIG. 23C.

In this way, when the process shown in FIG. 24 ends, the conversion into the bit stream data for transmission to the base station is completed, and the bit stream data is stored in the transmit bit stream data memory D12, and is then supplied to the transmit signal processor 8.

In connection with the above embodiment, description has been made of the FDTC message data and RDTC message data. However, the inventive concept described can be applied other messages, for instance, the receive data such as the forward analog voice channel (FVC) and the forward analog control channel (FOCC), and the transmit data such as reverse analog control channel (RECC) and the reverse analog voice channel (RVC). However, where the bit types are other than those described above, then the receive bit definition table 340 and the transmit bit definition table 344 need be altered.

Figure 26:
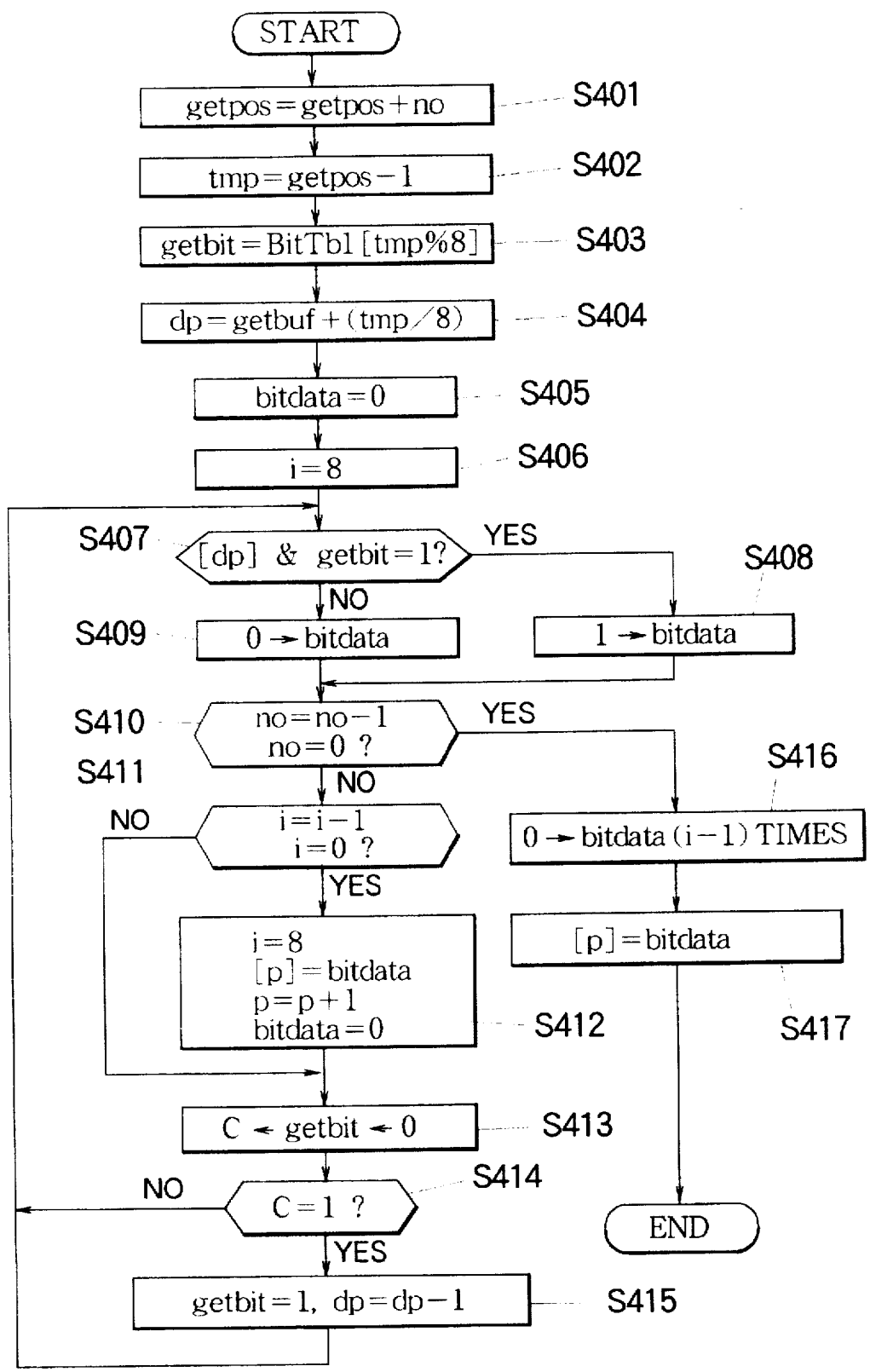
FIG. 26 is a flowchart showing the operation for extracting a sequence of bits forming part of the bit stream data from the first reception memory and storing the byte stream data in the second reception memory;.

Referring now to FIG. 26, detailed description will be made of the operation for extracting the data (group of bits) from the bit stream data memory, i.e., the receive bit stream data memory D1, by means of the bit sequence operation register 336, and storing the extracted data in the byte stream data memory, i.e., the receive byte stream data memory D2, at the step S312 in the embodiment of FIG. 21. In this embodiment, the order of the bytes in the receive byte stream data memory D2 is reversed for ease of processing by means of a 8086 CPU.

Figures 27, 28:
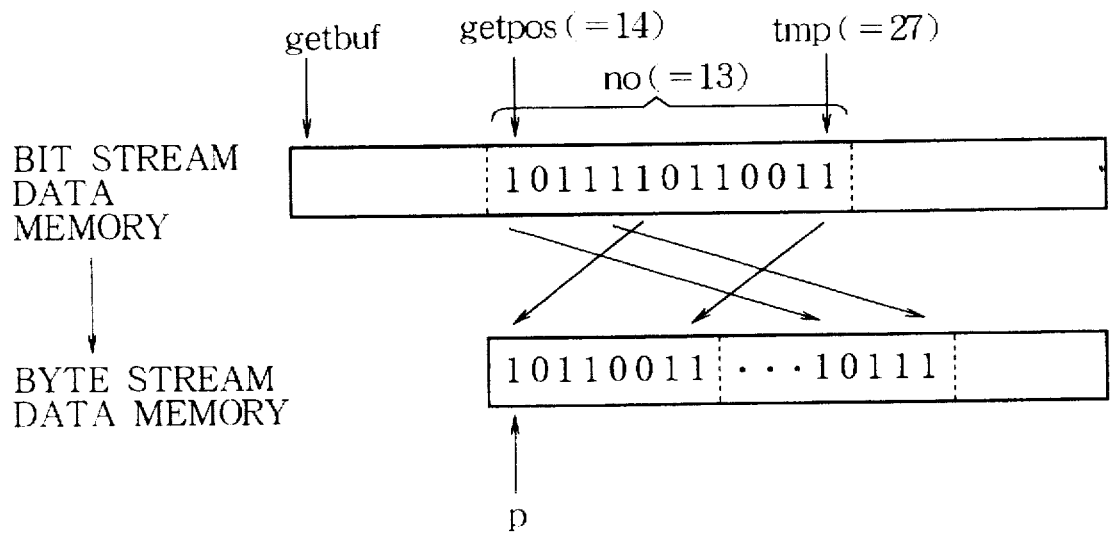
FIG. 27 is a diagram showing the conversion of the bit stream data into the byte stream data.
FIG. 28 is a diagram showing an example of bit pattern table.
Figure 29:
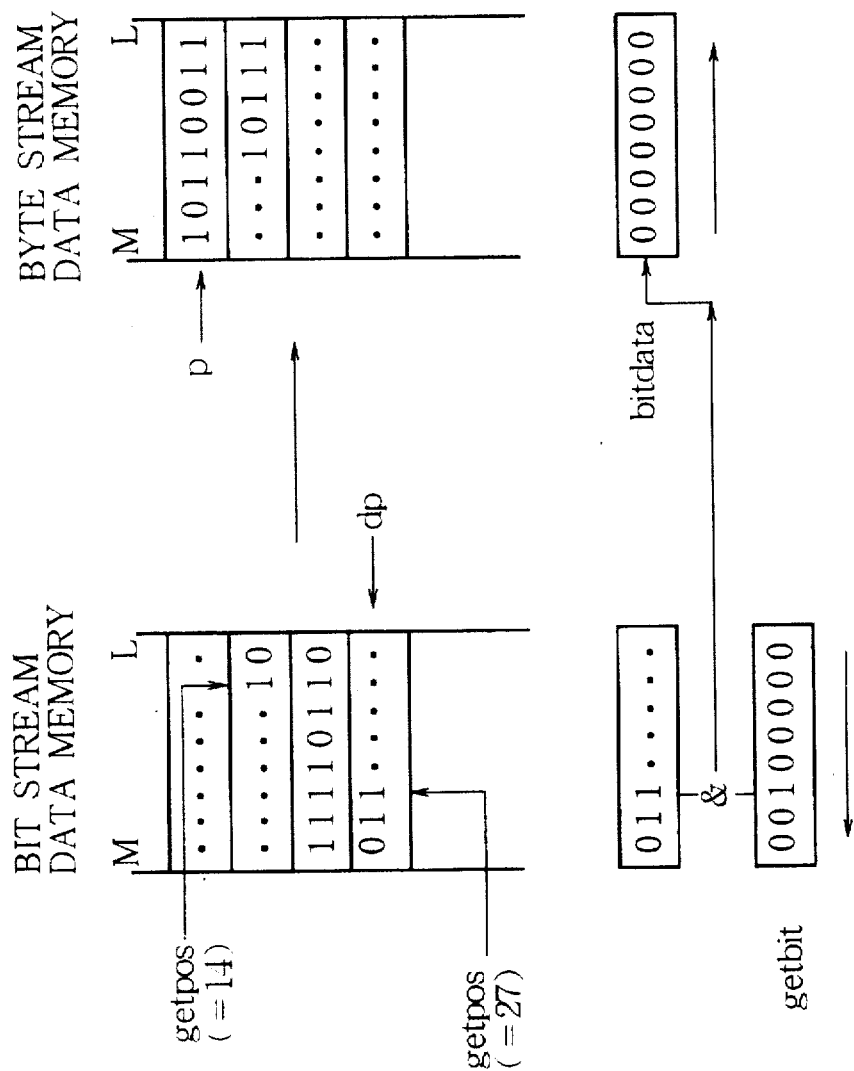
FIG. 29 is a diagram showing how the bit stream data is converted into byte stream data and written in the second reception memory.

As an example, let us assume a situation where a group of n bits ("n" being equal to the value in the column "no" in the control message table) are extracted, starting from the m-th bit position ("m" being equal to the value of "getpos") in the receive bit stream data memory D1, as shown in FIG. 27 and FIG. 29. That is, "getpos" indicates the position of the bit at the head of sequence of bits which are to be extracted, and "no" indicates the number of bits which are to be extracted, and is read from the receive bit definition table. In the illustrated example "no" is assumed to be 13, and "getpos" is assumed to be 14.

At the first step S401, the CPU 11a extracts "getpos" and determines a new value of "getpos" by:

$$getpos = getpos + no$$

At the next step S402, the CPU extracts the new value of "getpos" and determines a temporary variable "tmp" by:

$$tmp = getpos - 1$$

The value of "tmp" indicates the position of the bit at the tail of the sequence of bits which are to be extracted. The CPU 11a sets "tmp" in a predetermined area in the bit sequence operation register 336.

At the next step S403, the CPU 11a selects one of the eight rows of the bit pattern table (BitTb1) 348 shown in FIG. 28 (and also in FIG. 18), according to the value of tmp%8, i.e., a remainder of division tmp/8, and sets the contents of the selected row of the table in a register "getbit". That is, the tmp%8-th table is selected, with the value of tmp%8 being given on the left side in each row of the table. As illustrated, each row contain 8 bits, and tmp%8-th row (tmp%8 being 0 to 7) consists of bit "1" at the tmp%8-th bit (tmp%8 being 0 to 7) as counted from the left end, and bits "0" at the remaining bit positions.

At the next step S404, the CPU 11a determines a pointer "dp" by:

$$dp = getbuf + tmp/8$$

where "getbuf" indicates the position (address) of the first byte of the receive bit stream data memory D1 within the entire RAM 11d.

The value of tmp/8 is determining by rounding up to the next integer.

The CPU 11a sets data pointer "dp" in another predetermined area in the bit sequence operation register 336.

At the next step S405, the CPU 11a resets a bit data register "bitdata" (FIG. 29) in the bit sequence operation register 336. At the next step S406, the CPU 11a initializes a loop counter (not shown). That is, a variable "i" stored in the loop counter is set to be an initial value "8". This is because one byte consists of eight bits.

At the step S407, judgement is made whether any of the logical products of the respective bits of the byte data addressed by the data pointer "dp" and the corresponding bits of the data in the register "getbit" is "1". In other words, judgment is made as to whether the bit (called "extracted bit") in the byte data addressed by the data pointer "dp" and at the bit position corresponding to the bit "1" in the register "getbit" is "1".

If the extracted bit is "1", "1" is input to the left end of the register "bitdata" and at the same the contents of the register "bitdata" are shifted rightward by one bit (S408). If the extracted bit is "0", "0" is input to the left end of the register "bitdata" and at the same time the contents of the register "bitdata" are shifted rightward by one bit (S409).

At the step S410, the value of "no" stored in the bit sequence operation register 336 is decremented by one, and judgement is made whether the new value of "no" is zero, that is, whether the number of bits of the bit data having been extracted from the receive bit stream data memory D1 has reached the number set by the control message table.

If there is still any bit yet to be extracted from the receive bit stream data memory D1, the result of judgement at the step S410 will be "NO".

At the step S411, the value of "i" stored in the loop counter is decremented by one, and judgement is made whether the new value of "i" is zero, i.e., the rightward shift has been conducted the number of times (eight times) preset by the loop counter. If the rightward shift has not been conducted the preset number of times (eight times), then the result of the judgement at the step S411 will be "NO". Then, at the step S413, the contents in the register "getbit" are shifted leftward by one bit, with "0" being input to the right end of the register, and carry C being output from the left end.

At the step S414, judgement is made whether the carry C is "1" or "0", that is whether the leftward shift has been conducted the number of times corresponding to the number of bits ("three" in the example under consideration) to be extracted from the byte data being addressed by the data pointer "dp".

If the answer at the step S414 is "YES", then the pointer "dp" is decremented by one, and the value of the register "getbit" is initialized, i.e., "1" is input to the right end of the register "getbit".

When it is found at the step S411 that the rightward shift has been conducted the number of times (eight times) set by the loop counter, the next step is step S412, where the loop counter is again initialized, i.e., set with "eight", and the current value of the register "bitdata" is written in the byte position in the receive byte stream data memory D2 which is addressed by the pointer "p". The pointer "p" is then incremented by one, and the register "bitdata" is cleared. The step S412 is followed by the step S413.

If the result of the judgement at the step S410 is "YES", i.e., the number of bits of the data having been designated by the initial value of "no" have been extracted from the receive bit stream data memory D1, the bit data in the register "bitdata" is shifted rightward (i−1) times, i.e., until the rightmost bit of the sequence of bits having been formed by the logical product of the contents in the register "getbit" and the data in the byte position addressed by the data pointer "dp" reaches the right end of the register "bitdata".

The contents in the register "bitdata" are then written in the byte position within the receive byte stream data memory D2 being addressed by the data pointer "p".

By the above described steps, the uppermost byte on the right side of FIG. 29 is filled with a sequence of bits consisting of three bits toward its right end identical to the three bits toward the left end of the lowermost byte position on the left side of FIG. 29 and five bits toward its left end identical to the five bits toward the right end of the second byte position from the bottom on the left side of FIG. 29; and is filled with a sequence of bits consisting three bits toward its right end identical to the three bits toward the left end of the second byte position from the bottom on the left side of FIG. 29, and two bits next to the above mentioned three bits, the two bits being identical to the two bits toward the right end of the third byte position from the bottom on the left side of FIG. 29. The remaining bit positions toward the left end of the second byte position from the top on the right side of FIG. 29 are filled with "0" although it is immaterial whether thy are filled with "1" or "0".

Thus, the group of thirteen bits forming part of the bit stream data in the receive bit stream data memory D1, as shown on the left side of FIG. 29 is converted into byte stream data, and stored in the receive byte stream data memory D2, as shown in the right side of FIG. 29.

Other groups of bits are processed in the same way.

The value "getpos" indicative of the position of the head of the sequence of bits which are to be extracted, the value "no" indicative of the number of bits to be extracted, and the pointer "p" addressing the byte position in the receive byte stream data memory D2 into which the byte stream data obtained by the conversion is to be written are set by the control message table 342.

In this way, the bit stream data in the receive bit stream data memory D1 is converted into byte stream data, and stored in the receive byte stream data memory D2.

Figure 30:
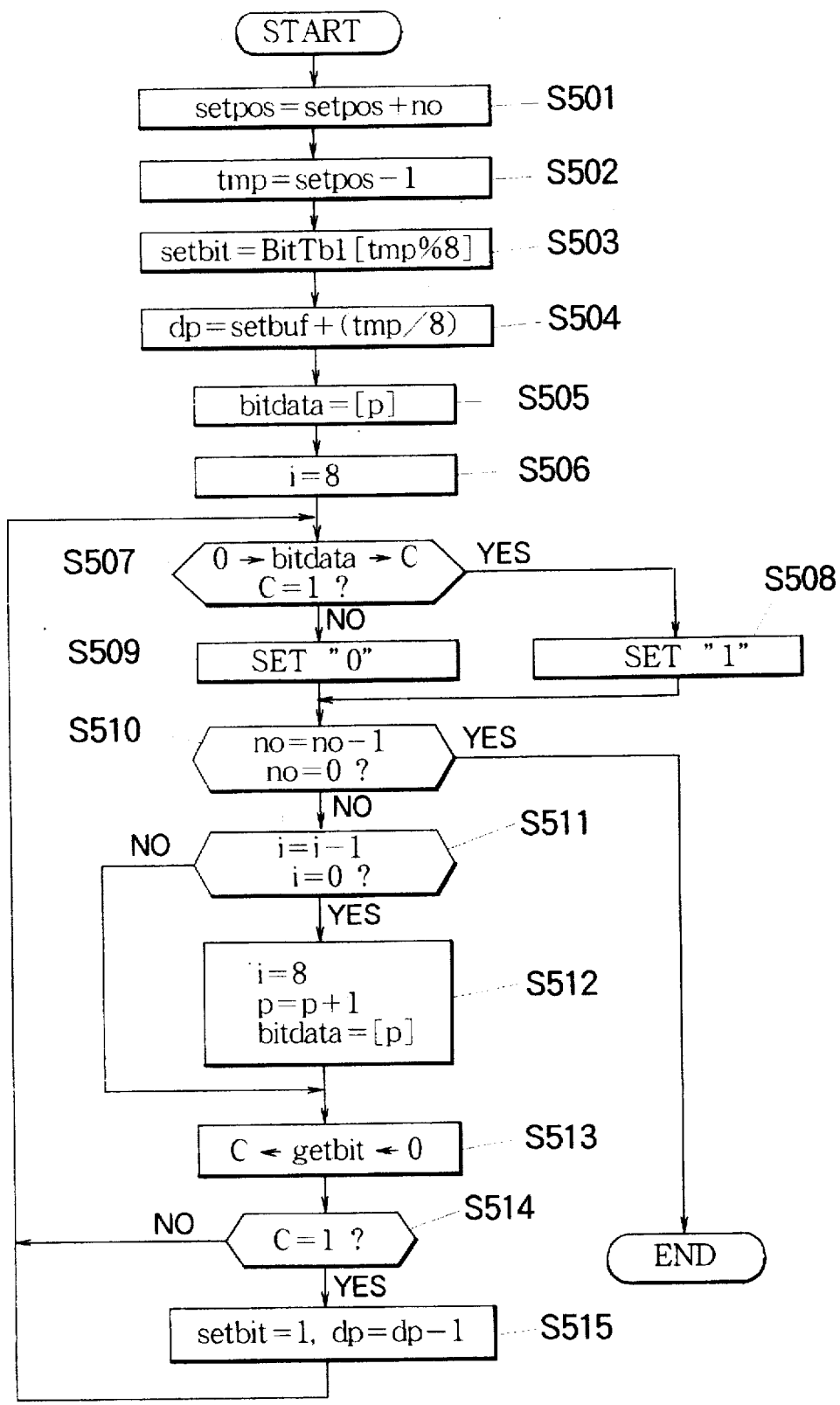
FIG. 30 is flowchart showing the operation for converting the byte stream data in the first transmission memory, into the bit stream data and storing the bit stream data in the second transmission memory.

Referring now to FIG. 30, detailed description will be made of the operation for extracting the data from the transmit byte stream data memory D11, by means of the bit sequence operation register 336, and storing it in the transmit bit stream data memory D12, at the step S329 in FIG. 24. As was described in connection with the conversion from bit stream data to byte stream data, the order of the bytes in the transmit byte stream data memory D11 is reversed for ease of processing by means of a 8086 CPU.

Figure 31:
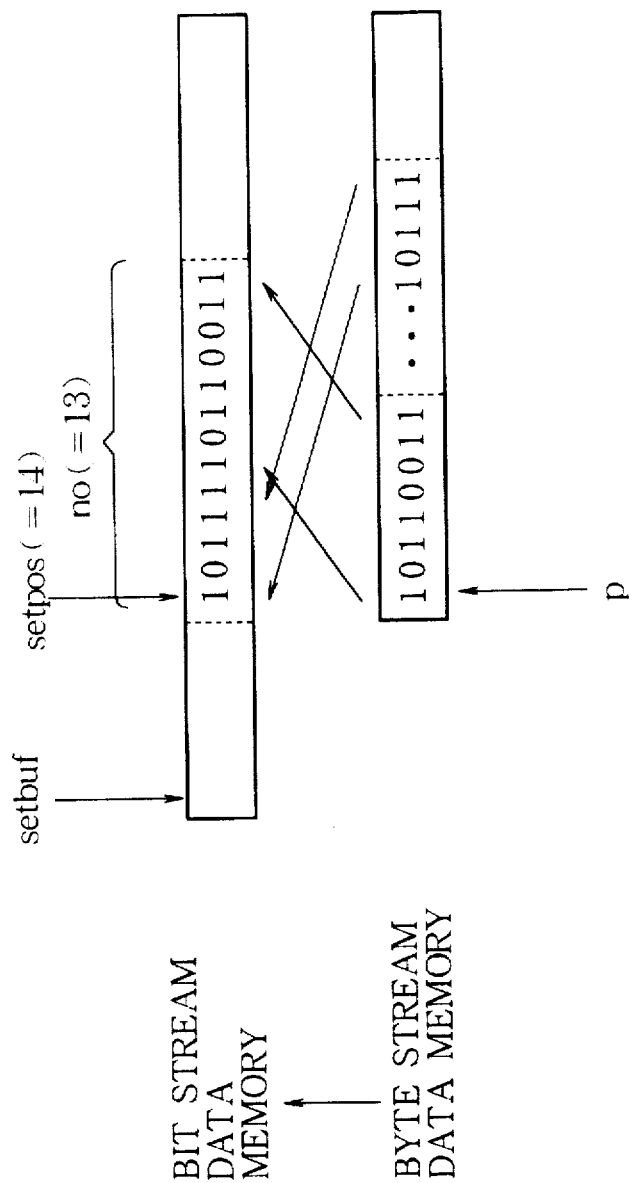
FIG. 31 is a diagram showing how the byte stream data is converted into bit stream data.
Figure 32:
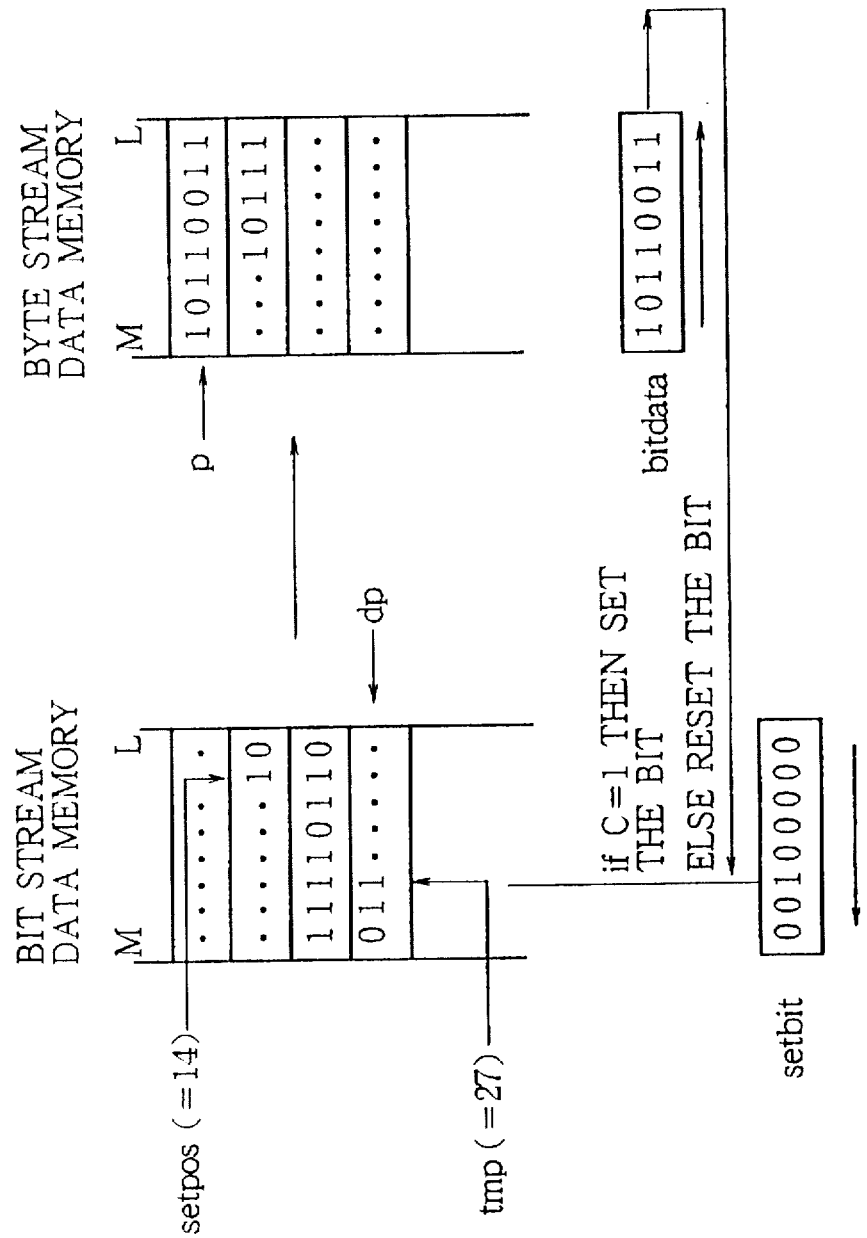
FIG. 32 is a diagram showing how the byte stream data is converted into bit stream data and written in the second transmission memory.

As an example, let us assume a situation where a group of n bits (("n" being equal to the value in the column "no" in the instruction message table) are written, starting from the m-th bit position ("m" being equal to a value of "setpos") in the transmit bit stream data memory D12, as shown in FIG. 31 and FIG. 32. That is, "setpos" indicates the position of the bit at the head of the sequence of bit positions in which the bit data obtained by the conversion are to be written, and "no" indicates the number of bits which are to be written. The value "no" is known from the instruction message table. In the illustrated example "no" is assumed to be 13, and "setpos" is assumed to be 14.

At the first step S501, the CPU 11a extracts "setpos" and determines a new value of "setpos" by:

$$setpos = setpos + no$$

At the next step S502, the CPU extracts the new value of "setpos" and determines a temporary variable "tmp" by:

$$tmp = setpos - 1$$

The value of "tmp" indicates the position of the bit at the tail of the sequence of bit positions at which the bit data obtained by conversion are to be written. The CPU 11a sets "tmp" in a predetermined area in the bit sequence operation register 336.

At the next step S503, the CPU 11a selects one of the eight rows of the bit pattern table (BitTbl) 348 shown in FIG. 28, according to the value of "tmp%8", and sets the contents of the selected row of the table in a register "setbit". That is, the tmp%8-th table is selected, with the value of tmp%8 being given on the left side in each row of the table.

At the next step S504, the CPU 11a sets a pointer "dp" by:

dp=setbuf+(tmp/8)

where "setbuf" indicates the position (address) of the first byte of the transmit bit stream data memory D12 within the entire RAM 11d.

The value of "tmp/8" is determined by rounding up to the next integer.

The CPU 11a sets the pointer "dp" in another predetermined area in the bit sequence operation register 336.

At the next step S505, the CPU 11a sets, in a bit data register "bitdata", the contents of the byte data addressed by the pointer "p". At the next step S506, the CPU 11a initializes the loop counter, not shown. That is, a variable "i" stored in the loop counter is set to be an initial value "8".

At the step S507, "0" is input to the left end of the register "bitdata", and the contents of the register "bitdata" are shifted rightward by one bit, and judgment is made whether the carry C, output from the right end of the register "bitdata" is "1" or "0".

If the carry C is "1", then at the step S508, "1" is set in the byte position addressed by the data pointer "dp" and at the bit position corresponding to the bit position in the register "setbit" at which the value is "1".

If the carry C is "0", then at the step S508, "0" is set in the byte position addressed by the data pointer "dp" and at the bit position corresponding to the bit position in the register "setbit" at which the value is "1".

At the step S510, the value "no" stored in the bit sequence operation register 336 is decremented by one, and judgement is made whether the new value of "no" is zero, that is, whether the number of bits of the bit data having been written in the transmit bit stream data memory D12 has reached the number set by the instruction message table.

If there is still any bit yet to be written in the transmit bit stream data memory D12, the result of judgement at the step S510 is "NO".

Then, at the step S511, the value "i" stored in the loop counter is decremented by one, and judgement is made whether the new value of "i" is zero, i.e., the rightward shift has been conducted the number of times (eight times) preset by the loop counter. If the result of the judgement at the step S511 is "NO", the next step is the step step S513, where the contents in the register "setbit" are shifted leftward by one bit, with "0" being input to the right end of the register, and carry C being output from the left end.

At the step S514, judgement is made whether the carry "C" is "1" or "0", that is whether the leftward shift has been conducted the number of times corresponding to the number of bit positions ("three" in the example under consideration) into which the bit data obtained by conversion are to be written in the byte position addressed by the data pointer dp.

If the answer at the step S514 is "YES", then the next step is the step S515, where the pointer "dp" is decremented by one, and the value of the register "setbit" is initialized, i.e., "1" is input to the right end of the register "getbit".

When it is found at the step S511 that the rightward shift has been conducted the number of times (eight times) set by the loop counter, the next step is step S512, where the loop counter is again initialized, i.e., set with "eight", and the pointer "p" is then incremented by one, and the contents of the byte data addressed by the pointer "p" are set in the register "bitdata".

If it is found at the step S510 that the number of bits having been designated by the initial value of "no" have been written in the second transmission memory D12, then the process is terminated.

By the above described steps, the three bits toward the right end of the uppermost byte on the right side of FIG. 32 is written in the three bit positions toward the left end of the first byte position from the bottom on the left side of FIG. 32, the five bits toward the left end of the uppermost byte on the right side of FIG. 32 is written in the five bit positions toward the right end of the second byte position from the bottom on the left side of FIG. 32, the three bits toward the right end of the second byte on the right side of FIG. 32 are written in the three bit positions toward the left end of the second byte position from the bottom on the left side of FIG. 32, and the two bits next to the above-mentioned three bits in the second byte position from the top on the right side of FIG. 32 are written in the two bit positions toward the right end of the third byte position from the bottom on the left side of FIG. 32.

In this way, the byte stream data in the transmit byte stream data memory D11 is converted into a group of bits forming bit stream data, as shown in FIG. 32, and stored in the transmit bit stream data memory D12. The group of bits thus obtained form part of the bit stream data.

Other groups of bits may be produced and stored in the same way.

The value "setpos" indicative of the position of the head of the sequence of bit positions in which the bit data obtained by conversion are to be written, the value "no" indicative of the number of bits to be written, and the pointer "p" addressing the byte position in the transmit byte stream data memory D11 from which the data should be read are set by the instruction message table 346.

In this way, the byte stream data in the transmit byte stream data memory D11 is converted into bit stream data, and stored in the transmit bit stream data memory D12.

According to the embodiment of FIG. 18 to FIG. 32, arbitrary bit stream data exchanged between the base station and the wireless telephone can be processed efficiently at the wireless telephone, by simply providing a parameter appending means such as a bit definition table formed in the ROM. Accordingly increase in the size and cost of the wireless telephone can be restrained.

What is claimed is:

1. A wireless telephone in a mobile communication system, which performs transmission in a series of bursts, in synchronism with a received signal in the form of a frame, transmitted from a base station, each transmission burst being performed responsive to a transmission timing signal, comprising:

means for detecting a sync signal from the received signal;

means for generating said transmission timing signal on the basis of the sync signal;

means for autonomously generating said transmission timing signal when the sync signal is not detected;

means effecting each of said transmission bursts in accordance with the transmission timing signal; and means for preventing generation of said transmission timing signal when the sync signal is not detected for a predetermined amount of time.

2. The wireless telephone according to claim 1, wherein said means for autonomously generating said transmission timing signal comprises timer means measuring a predetermined time corresponding to an interval between successive transmission bursts from the generation of the transmission timing signal for a preceding transmission burst with the measurement of the predetermined time being made by reference to an internal oscillator.

3. A method of communication of a wireless telephone in a mobile communication system, which performs transmission in a series of bursts, in synchronism with a received signal in the form of a frame, transmitted from a base station, each transmission burst being performed responsive to a transmission timing signal, comprising the steps of:

detecting a sync signal from the received signal;

generating, when said sync signal is detected, the transmission timing signal on the basis of the sync signal;

autonomously generating the transmission timing signal when the sync signal is not detected;

effecting each of said transmission bursts in accordance with the transmission timing signal; and stopping the generation of the transmission timing signal when the sync signal is not detected for a predetermined amount of time.

4. The method of communication according to claim 3, wherein said step of autonomously generating said transmission timing signal comprises measuring a predetermined amount of time corresponding to an interval between successive transmission bursts from the generation of the transmission timing signal for a preceding transmission burst with the measurement of the predetermined amount of time being made by reference to an internal oscillator.

5. A wireless telephone in a TDMA system having a Mobile Assisted Hands-Off (MAHO) function, comprising:

reception means for receiving a signal from a base station, said reception means capable of reception in a selected one of a plurality of channels of different frequencies;

a controller for causing the reception means in a state of reception in a first channel, to perform tentative reception and measurement in a second channel to determine whether it is desirable to change a reception channel signal from the first channel to the second channel;

a Phase Lock Loop (PLL) for determining the frequency of the signal received by said reception means;

said controller normally causing said PLL to generate a first frequency corresponding to the first channel by providing said PLL with first control data, causing, during said MAHO operation, said PLL to generate a second frequency corresponding to the second channel by providing said PLL with second control data, and applying a change timing signal for causing said PLL to change from the first frequency to the second frequency;

means for measuring the channel quality of the said second channel;

wherein said signal transmitted from said base station is time-divided in a plurality of slots including a first slot which is currently allocated to the wireless telephone and a second slot in which the measurement of the channel quality of said second channel is effected, and said controller performs the operation for transferring the first control data to said PLL, prior to the commencement of the second slot, and performs said operation for changing the generated frequency during said second slot.

6. The wireless telephone according to claim 5, wherein said controller transfers the second control data to said PLL in said first slot.

7. The wireless telephone according to claim 5, wherein said controller transfers the second control data to said PLL during a period other than a period for transmission from the wireless telephone to the base station.

8. The wireless telephone according to claim 7, wherein said controller transfers the second control data to said PLL in a period other than the first slot.

9. The wireless telephone according to claim 5, wherein said controller transfers the second control data to said PLL in a period other than the first slot.

10. A wireless telephone comprising:

a receive bit stream data memory for storing bit stream data received from a base station;

a plurality of message tables selected according to a message type of the bit stream data, each message table defining how each part of the bit stream data is processed for conversion into byte stream data;

control means for extracting said each part of the bit stream data and producing a corresponding part of said byte stream data;

said each message table designating the number of bits forming said each part of the bit stream data.

11. The wireless telephone according to claim 10, wherein said each message table further designates a memory location within said bit stream data memory from which said each part of the bit stream data is extracted.

12. The wireless telephone according to claim 10, further comprising a receive byte stream data memory for storing the byte stream data, wherein said each message table designates a memory location in said receive byte stream data memory into which said corresponding part of the byte stream data obtained by conversion from the bit stream data is stored.

13. The wireless telephone according to claim 10, wherein said each message table defines the manner of processing said each part of the bit stream data according to a bit type of said each part.

14. A wireless telephone comprising:

a transmit byte stream data memory for storing byte stream data to be transmitted to a base station;

a plurality of message tables selected according to a message type of the byte stream data, each message table defining how each part of the byte stream data is processed for conversion into bit stream data;

control means for extracting said each part of the byte stream data and producing a corresponding part of the bit stream data; and a transmit bit stream data memory for storing the bit stream data obtained by conversion from said byte stream data;

wherein said each message table designates the bit position into which said corresponding part of the bit stream data is stored.

15. The wireless telephone according to claim 14, wherein said each message table designates the byte position in said byte stream data memory from which said each part of the byte stream data is extracted.

16. The wireless telephone according to claim 14, wherein said each message table defines the manner of processing of said each part of the byte stream data according to a bit type of said each part.

* * * * *